United States Patent

Endo et al.

Patent Number: 5,880,557
Date of Patent: *Mar. 9, 1999

[54] TRANSPARENT PLATE, PROCESS FOR THE PRODUCTION THEREOF AND THEIR APPLIED SCREEN DISPLAY PLATE, AND CATHODE RAY TUBE AND PROCESS FOR THE PRODUCTION THEREOF

[75] Inventors: Yoshishige Endo, Tsuchiura; Masahiko Ono; Toshihiro Yamada, both of Ibaraki-ken; Takao Kawamura, Chiba; Hiromitsu Kawamura; Katsumi Kobara, both of Mobara; Takeshi Araya, Higashikurume, all of Japan

[73] Assignee: Hitachi, Ltd., Tokyo, Japan

[*] Notice: The term of this patent shall not extend beyond the expiration date of Pat. No. 5,612,128.

[21] Appl. No.: 818,428

[22] Filed: Mar. 17, 1997

Related U.S. Application Data

[62] Division of Ser. No. 341,946, Nov. 16, 1994, Pat. No. 5,612,128, which is a continuation of Ser. No. 855,055, Mar. 19, 1992, abandoned, which is a continuation-in-part of Ser. No. 404,553, Sep. 8, 1989, Pat. No. 5,189,337.

[30] Foreign Application Priority Data

Sep. 9, 1988 [JP] Japan .................. 63-224658
Mar. 19, 1991 [JP] Japan .................. 3-054371

[51] Int. Cl.$^6$ .............. H01T 29/10; H01J 31/00
[52] U.S. Cl. .............. 313/461; 313/466; 313/479; 313/477 R
[58] Field of Search .............. 313/110, 112, 313/113, 474, 477 R, 478–79, 461, 466; 252/518; 75/233; 358/252; 359/601; 106/286.4, 286.8, 286.1, 287.19, 287.34, 459, 481; 428/323, 325, 331, 404, 426, 428, 429, 446, 702, 206, 210, 212, 307.3, 402, 386–87

[56] References Cited

U.S. PATENT DOCUMENTS

| | | | |
|---|---|---|---|
| 4,579,638 | 4/1986 | Scherber | 204/192 P |
| 4,802,737 | 2/1989 | Denton | 350/166 |
| 4,816,333 | 3/1989 | Lange et al. | 428/331 |
| 4,855,180 | 8/1989 | Kawamura | 428/328 |
| 4,937,148 | 6/1990 | Sato et al. | 423/618 |
| 4,945,282 | 7/1990 | Kawamura et al. | 313/479 |
| 5,116,644 | 5/1992 | Asai et al. | 427/164 |
| 5,139,760 | 8/1992 | Ogawa et al. | 423/328 |
| 5,165,992 | 11/1992 | Yajima | 428/328 |
| 5,189,337 | 2/1993 | Endo et al. | 313/479 |
| 5,612,128 | 3/1997 | Endo et al. | 428/323 |

OTHER PUBLICATIONS

Kirk–Othner Encyclopedia of Chemical Technology, 3rd Edition, vol. 20, Copyright 1982, pp. 766–776.
A new vacuum–etched high transmittance (antireflection) film (App. Phys. Lett. 36(9) 727–730 (1980).
Antireflection Coatings J. Thomas Cox and George Haas Physics of Thin Films 2, (1964) pp. 243–284.

*Primary Examiner*—Ashok Patel
*Assistant Examiner*—Mack Haynes
*Attorney, Agent, or Firm*—Antonelli, Terry, Stout & Kraus, LLP

[57] ABSTRACT

Disclosed are an ultrafine particle film which is effective for the prevention of an electrostatic charge and reflection and can be applied to a large area at a low cost, a cathode ray tube to which the ultrafine particle film is applied, and image display plate to which the ultrafine particles is applied, and a process for producing the ultrafine particle film which comprises attaching a coating solution bath to a Braun tube surface and the like, introducing a containing solution containing anti-reflection $SiO_2$ ultrafine particles and antistatic $SnO_2$ ultrafine particles, and elevating up or down on the Braun tube surface and the like at a constant rate.

10 Claims, 8 Drawing Sheets

FIG. 8(a) FIG. 8(b) FIG. 8(c)
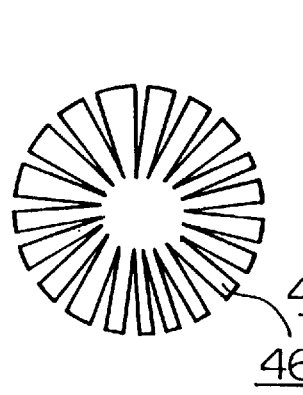
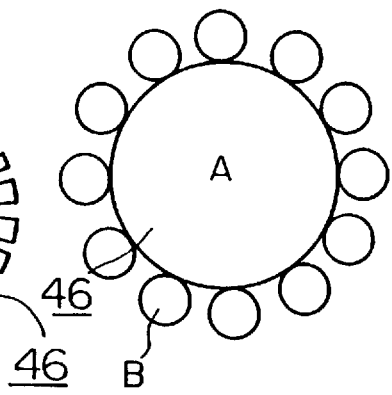
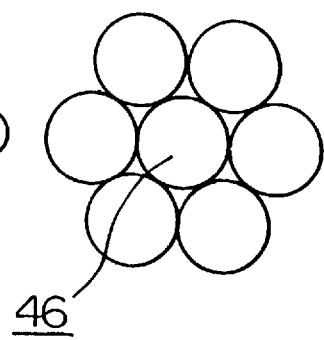
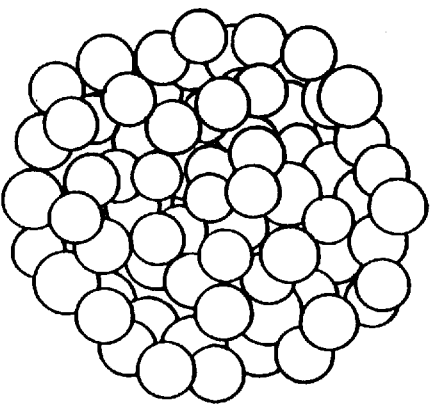
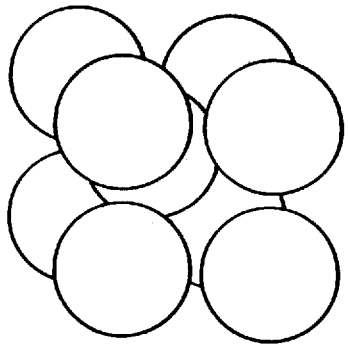
FIG. 8(d) FIG. 8(e)

TRANSPARENT PLATE, PROCESS FOR THE PRODUCTION THEREOF AND THEIR APPLIED SCREEN DISPLAY PLATE, AND CATHODE RAY TUBE AND PROCESS FOR THE PRODUCTION THEREOF

This is a division of application Ser. No. 08/341,946, filed Nov. 16, 1994 (now U.S. Pat. No. 5,612,128); which is a continuation of application Ser. No. 07/855,055 filed Mar. 19, 1992 now abandoned, which is a continuation-in-part of application Ser. No. 07/404,553, filed Sep. 8, 1989 (now U.S. Pat. No. 5,189,337).

BACKGROUND OF THE INVENTION

1. Field of the Invention

The present invention relates to a transparent plate, a process for the production thereof and a transparent plate-applied screen display plate, and a Braun tube (cathode ray tube) and a process for the production thereof. In particular, it relates to a transparent plate using ultrafine particles capable of effectively functioning as an antistatic and anti-reflection film for a screen display plate, a process for producing the same and a transparent plate-applied screen display plate, and a Braun tube (cathode ray tube) and a process for the production thereof.

2. Related Art

Films to reduce the reflectance of a transparent plate surface has been long studied, and have been applied to lenses for cameras and ophthalmic glasses. At present, such films are used as an anti-reflection filter for reducing the reflected light on VDTs (visual display terminal). A variety of anti-reflection films have been considered, and mainly used now are multi-layered films and heterogeneous films.

A multi-layered film-has- a structure in which a material having a low reflectance and a material having a high reflectance are alternately stacked to form at least three layers. Its anti-reflection effect is a synergistic effect produced by the optical interference function of each layer. Multi-layered films are discussed in Physics of Thin Films, 2 (1964), pp. 243–284.

A heterogeneous film having a reflectance distribution in the film thickness direction works as an anti-reflection when the film has a lower refractive index than a glass base plate. A heterogeneous film is generally formed by rendering a transparent plate surface porous.

Apl. Phys. Lett., 36 (1980), pp. 727–730 discusses a method of reducing the reflectance in which a heterogeneous film is produced by forming an insular metal deposition film on a-glass surface and forming a fine uneven surface by sputter etching.

Solar Energy 6 (1980), pp. 28–34 discusses a method of reducing the reflectance in which a soda glass surface is rendered porous by dipping it in an $H_2SiF_6$ solution oversaturated with $SiO_2$.

On the other hand, in a cathode ray tube, it is required not only to form an electrically conductive film for prevention of electrostatic charge but also to use devices for prevention of reflection.

Meanwhile, it is known that the front panel surface (image display plate) of a cathode ray tube such as a Braun tube is electrostatically charged. The reason therefor is as follows. Aluminum is generally deposited to form a thin and uniform film on a phosphor 43 applied to an inner surface 42 of a Braun tube 41 as shown in FIG. 4. In the application of a high voltage to the aluminum film 44, an electrostatic charge occurs on a front panel 45 of the Braun tube due to electrostatic induction when the high voltage is applied and cut off.

JP-A-61-51101 discloses a method of forming an antistatic and anti-reflection film for prevention of both electrostatic charge and reflection on such a display tube surface. In this method, first, an electrically conductive film is formed on a glass base plate by a physical gas phase method or a chemical gas phase method such as a vacuum deposition method and a sputtering method, and then, an anti-reflection film is formed thereon.

In the above prior arts, the film forming method is limited to a sputtering or vacuum deposition method, and it is required to control the film thickness highly accurately. There is therefore a defect in that a high cost is required and it is difficult to apply these prior art methods to a base plate having a large surface area.

In particular, the above prior art method uses a two-layer structure, in which an electrically conductive film and an anti-reflection film are formed, respectively. There have been therefore problems in productivity and a cost. Further, when such films are formed on the surface of a display tube such as a Braun tube which limits the firing temperature for forming films to low temperatures, there have been problems in film strength and reflectivity.

In a reflection film containing ultrafine particles, a minimum reflectance is obtained when the ultrafine particles are highly densely and regularly arranged on a base plate.

FIG. 5 schematically shows a cross-sectional view of a film in which ultrafine particles are systematically and regularly applied to a transparent base plate. In FIG. 5, numeral 46 indicates ultrafine particles, numeral 47 indicates a binder layer, and numeral 48 indicates a base plate. In this Figure, $n_0$ is the refractive index of air, $n_1$ is the refractive index of an ultrafine particle layer, da, on the air side, $n_2$ is the refractive index of the da layer on the ultrafine particle side, $n_S$ is the refractive index of a layer formed from ultrafine particles and a binder, and $n_G$ is the refractive index of the transparent base plate. In this case, the reflectance, Ra, of the da layer is represented by the equation (expression 1), and the reflectance index, Rb, of the db layer, by the equation (expression 2).

$$Ra = 1 - \frac{4n_0 n_1 n_2 n_S}{(n_1 n_S + n_0 n_2)^2 - (n_1^2 - n_0^2)(n_S^2 - n_2^2)\sin^2 \delta a/2} \quad \text{(Expression 1)}$$

$$\text{wherein } \delta a = \frac{2\pi}{\lambda}(n_1 + n_2) \cdot da$$

$$Rb = 1 - \frac{4n_2 n_S^2 n_G}{n_S^2(n_2 + n_G)^2 - (n_G^2 - n_S^2)(n_S^2 - n_2^2)\sin^2 \delta b/2} \quad \text{(Expression 2)}$$

$$\text{wherein } \delta b = \frac{2\pi}{\lambda}(2n_S) \cdot db$$

When the reflectance of a portion where no ultrafine particles are present is taken as Rc, the total reflectance is represented by the equation (expression 3), $$R=(1-\alpha)(Ra+Rb)+Rc \quad \text{(Expression 3)}$$

in which α is the ratio of an area where no ultrafine particles are present.

When the binder is a vitreous binder, Rc is generally 4.2%.

Ra is about 0.19% at $\lambda=550$ nm on the assumption that $n_0=1.0$, $n_1=1.10$, $n_2=1.38$ and $n_S=1.47$. When the transparent plate is glass, Rb is about 0.04% at $\lambda=550$ nm on the assumption that $n_G=1.53$ and that the other refractive indexes are the same as those in Ra.

The consequence is (Ra+Rb)<Rc. That is, it is understood that the smaller a is, the smaller the reflectance is. In other words, when ultrafine particles are regularly and densely applied, the reflectance is the lowest.

The present inventors have already proposed the application of ultrafine particles to an anti-reflection film and filed on Sep. 8, 1989 as U.S. Pat. No. 07/404553 whose content is incorporated herein by reference. As a result of a further study, it has been also found that a coating solution level is elevated up or down on the base plate surface at a constant rate, whereby ultrafine particles contained in the coating solution are regularly arranged on, and applied to, the base plate surface to give a low reflectance close to a theoretical value.

It has been also found that, in the above case, ultrafine particles having an uneven surface are used, whereby there is obtained a film which shows a decrease in diffuse reflection and is not opacified.

It has been further found that, in the above case, antistatic ultrafine particles of which the diameter is not more than 1/10 of that of the anti-reflection ultrafine particles are incorporated, whereby antistatic ultrafine particles are arranged in a network form in gaps among the anti-reflection ultrafine particles to form an electrically conductive film.

The present invention provides an antistatic and anti-reflection film which can be applied to a large area at a low cost and an image display to which the film is applied.

The present invention is achieved either by filling a coating solution containing uniformly dispersed ultrafine particles in a bath positioned on the side of a surface of a base plate and pulling up the base plate at a constant rate, or by filling the above coating solution in a bath positioned on the side of a surface of a base plate at a constant rate.

The present invention is achieved by making uneven surfaces of anti-reflection ultrafine particles, or by at least making the surfaces porous. Otherwise, uneven portions may be formed by aggregating ultrafine particles to form fine particles which have gaps formed of the ultrafine particles on surfaces of the fine particles.

The process for producing a transparent plate, provided by the present invention, has a characteristic feature in that a film composed of ultrafine particles and a binder to be filled in gaps among said particles is formed on a transparent base plate by resting the base plate against a container, introducing a mixed coating solution containing said particles and said binder into the container to elevate the mixed coating solution level up on the base plate surface at a constant rate, or lowering the mixed coating solution level on the base plate surface at a constant rate, to form the ultrafine particle film on the base plate surface.

The transparent plate of the present invention has the following characteristic features. In a transparent plate obtained by forming an ultrafine particle film of ultrafine particles and a binder filled in gaps among the ultrafine particles on a transparent base plate, a coupling agent having a functional group to a material of the base plate is incorporated into the ultrafine particle film and/or allowed to present in the interface between the ultrafine particle film and the transparent base plate, and/or a coating liquid composed mainly of ethyl silicate is further applied onto a coating of the ultrafine particles.

The image display plate and the image display protection plate provided by the present invention have a characteristic feature in that the above-prepared transparent plate is applied to the surface of the transparent base plate or that the ultrafine particle film is directly formed on the image display plate surface.

The Braun tube of the present invention has a characteristic feature in that it is formed from the above image display plate or the above image display protection plate. In addition, the present invention can be also applied to other cathode ray tubes, liquid crystal display devices, window glass for automobiles and ophthalmic glasses, and the like.

The process for producing the Braun tube, provided by the present invention, has a characteristic feature in that the transparent base plate surface of the Braun tube is exposed through an opening portion provided on the side of a container, and a mixed solution containing ultrafine particles and a binder is introduced into the container to elevate the mixed coating solution level up on the base plate surface at a constant rate, or lowering the mixed coating solution level on the base plate surface at a constant rate, to form an ultrafine particle film on the base plate surface.

The process for producing the window glass for an automobile has a characteristic feature in that the transparent base plate surface of the window glass for an automobile is exposed through an opening portion provided on the side of a container, and a mixed solution containing ultrafine particles and a binder is introduced into the container to elevate the mixed coating solution level up on the base plate surface at a constant rate, or lowering the mixed coating solution level on the base plate surface at a constant rate, to form an ultrafine particle film on the base plate surface.

BRIEF DESCRIPTION OF DRAWINGS

FIG. 8 is a schematic cross-sectional view of one embodiment of the device of the present invention.

Numerals in the above Figures are as follows.

11 ... Braun tube, 12 ... coating bath, 13 ... coating solution, 14 ... pressure-adjusting valve, 15 ... overflowing valve, 16 ... solution tank, 17 ... solution-feeding pressure valve, 18 ... leaking valve.

DETAILED DESCRIPTION OF THE INVENTION

It is generally known that when a film is formed from a coating solution containing no ultrafine particles by a dipping method, the following equation (Expression 4) is established between the thickness, t, and the pulling-up rate, v, $$t = K(\eta v/pg)^{0.5} \qquad \text{(Expression 4)}$$

wherein η is the viscosity of a solution, p is the density of the solution, g is gravitational acceleration, and K is a constant.

Figure 6:
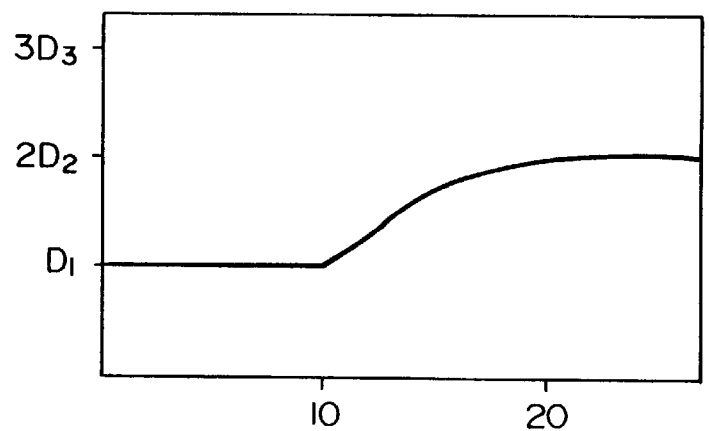
FIG. 6 shows film thickness characteristics of one embodiment of the ultrafine particle film of the present invention.

On the other hand, the present inventors have found that when the level of a mixed coating solution containing ultrafine particles is elevated up or down on the base plate surface at a constant rate, there is formed a film having structure in which the ultrafine particles are arranged in one layer up to a certain pulling-up rate and that when the pulling-up rate increases more, there is formed a film having a structure in which the ultrafine particles are arranged in two or more layers, as is shown in FIG. 6.

Therefore, when ultrafine particles, $D_2$, are incorporated as ultrafine particles for prevention of reflection, the resultant film has an apparent thickness of $D_2$ if the pulling-up rate is within the range in which one layer is formed. In this case, the critical rate is about 10 mm/s.

It is very difficult to apply a coating solution to form a film on the surface of a base plate having a complicated form such as a Braun tube by a usual dipping method. However, the present invention uses a bath containing a coating liquid in which a Braun tube surface is placed, and the coating liquid level is elevated up or down at a constant level, whereby a coating can be easily formed.

When a film is formed from a mixture of ultrafine particles, each component of the mixture exhibits its function. For example, when the mixture contains a large amount of ultrafine particles having an anti-reflection function, the resultant film mainly exhibits a low-reflection function due to surface coarseness. Further, when the ultrafine particles as other component of the mixture are electrically conductive ultrafine particles having a size of not more than 1/10 of the anti-reflection ultrafine particles, the resultant film also exhibits electrical conductivity due to an effect of their aggregating in a network form. Accordingly, the process of the present invention gives a film having two characteristics of anti-reflection and antistatic functions when the mixed solution is applied only once.

Further, when the mixed coating solution contains ultrafine particles of which the diameter is 2 to 3 times the diameter of the ultrafine particles as a major component, the former ultrafine particles are insularly arranged. This state is comparable to a state in which islands of relatively large ultrafine particles are sparsely spotted in the sea of anti-reflection ultrafine particles.

This distance among the relatively large ultrafine particles is about 1 to 2 μm. Therefore, when the film undergoes a mechanical friction force, these larger ultrafine particles are in contact, and the anti-reflection ultrafine particles are not in contact. As a result, no optical change occurs. Namely, the optical strength of the film against friction is remarkably improved. For the same reason, the easiness to remove dirt such as an oil is also improved.

When one touches a submicron-order uneven surface of a film with hands, a finger mark is transferred to the film, and it is difficult to remove it even with an alcohol. When, however, the above relatively large ultrafine particles are incorporated and insularly arranged, a finger mark is hardly transferred, and even if transferred, it can be easily cleaned off.

Further, the degree of diffuse reflection can be decreased by devising an uneven surface, forming a porous surface and aggregating ultrafine particles. The diffuse reflection refers to reflections in all the directions. According to the present invention, when a light path reaches a concave portion of the ultrafine particles, light no longer proceeds and terminates itself within the concave portion. In the diffuse reflection, the coated film looks opaque. At the same time, the transmissivity is deteriorated, and the resolution is decreased.

It is desirable to reduce the diffuse reflectance to zero while improving the resolution, but it is actually difficult to do so. When the ultrafine particles are replaced with further ultrafine particles (average particle diameter of 0.01 μm or less), the diffuse reflectance is decreased to zero. However, the regular reflectance comes close to that of the nontreatment state. Therefore, it is our proposal to form an uneven surface (including a porous surface and aggregation of ultrafine particles) in order to decrease the diffuse reflectance toward zero while maintaining the size of the ultrafine particles.

The present invention will be described with regard to its embodiments by reference to drawings. First, the constituent requirements of the present invention will be explained.
(Ultrafine particles)

The ultrafine particles are not specially limited in function as far as the transparency and the translucency are not hindered, but refer to those having an average particle diameter of not more than 1 μm. Typical functions thereof are antistatic, anti-reflection and/or infrared-reflection.

The material for the antistatic ultrafine particles is preferably selected from the group consisting of $SnO_2$ (tin oxide), $SnO_2+Sb_2O_3$ (antimony oxide), $In_2O_3$ (indium oxide), and $In_2O_3+SnO_2$. The material for the anti-reflection ultrafine particles is preferably selected from the group consisting of $SiO_2$ (silicon dioxide) and $MgF_2$ (magnesium fluoride). The material for the infrared-reflection ultrafine particles is preferably selected from the group consisting of $SnO_2$, $SnO_2+Sb_2O_3$, $In_2O_3$, $In_2O_3+SnO_2$, $TiO_2$ (titanium oxide) and $ZrO_2$ (zirconium oxide).

The above anti-reflection ultrafine particles preferably have an average particle diameter of 100 to 150 nm (0.1 to 0.15 μm). When this average particle diameter is less than 100 nm (0.1 μm), $SiO_2$, etc., may give a film having too flat an outermost surface, and no sufficient anti-reflection effect may be obtained. When it is more than 150 nm (0.15 μm), a sufficient anti-reflection effect can be obtained, but diffuse reflection increases. As a result, the film is opacified, and at the same time, the resolution may be decreased. Therefore, the particle diameter of the anti-reflection ultrafine particles is preferably 100 to 150 nm (0.1 to 0.15 μm). All the materials, $SiO_2$, $MgF_2$, etc., for the anti-reflection ultrafine particles have a refractive index of not more than 1.50. In this case, when ultrafine particles having uneven surfaces are used, scattered light on the ultrafine particle surfaces decreases. As a result, the diffuse reflection of the film as a whole greatly decreases, and the opacification can be overcome. The uneven surfaces of the ultrafine particles may be formed by any one of a method in which the surfaces of the ultrafine particles are made porous as shown in FIG. 8(a), a method in which smaller ultrafine particles are added to a relatively larger ultrafine particle as shown in FIG. 8(b), a method in which an aggregate of at least three ultrafine particles is formed, and other methods.

The antistatic ultrafine particles preferably have an average particle diameter of not more than 10 nm (0.01 μm). The ultrafine particles of different kinds may be used in combination. The particle diameter of the antistatic ultrafine particles used in combination of the anti-reflection ultrafine particles is preferably not more than 1/10 of the particle diameter of the anti-reflection ultrafine particles. That is, when a mixed solution containing two kinds of ultrafine particles having different particle diameters is applied, two kinds of the ultrafine particles of which the diameter ratio is within 1/10 are dispersed relatively well. However, when the diameter ratio is more than 1/10, the ultrafine particles having a smaller diameter aggregate in a network form without being dispersed.

Therefore, when the diameter of the antistatic ultrafine particles is within 1/10 of that of the anti-reflection ultrafine particles, these two kinds of ultrafine particles are dispersed to such an extent that the electrical conductivity is lost. As a result, the resultant film exhibits no antistatic function. On the other hand, when the diameter thereof is not less than 1/10 in the ratio, the antistatic ultrafine particles aggregate in a network form, and the resultant film is electrically conductive and excellently exhibits an antistatic function. In the present invention, the anti-reflection ultrafine particles have a diameter of 100 to 150 nm (0.01 to 0.15 μm). Therefore, the diameter of the antistatic ultrafine particles is preferably not more than 19 nm (0.019 μm).

In the amount ratio of the anti-reflection ultrafine particles and the antistatic ultrafine particles, the amount of the antistatic ultrafine particles is preferably not less than 10 percent of the total amount of the ultrafine particles. When this amount exceeds 50%, the anti-reflection function may be decreased, and it is therefore required to be not more than 50%.

For the same reason, it is preferred to incorporate not more than 20% by weight, based on the total amount of the ultrafine particles, of ultrafine particles of which the diameter is 2 to 3 times the diameter of the anti-reflection ultrafine particles. In addition, the "ultrafine particles" used in the present invention may refer to composite particles composed from at least two inorganic oxides, and there may be used ultrafine particles which are a mixture of at least two inorganic oxides or have particle structure in which one particle is included in other particle, and have an average particle diameter of not more than 0.1 μm. Preferred are ultrafine particles which satisfy the following conditions; the particle size distribution has a maximum peak in particles having particle diameters in the vicinity of their average particle diameter, the particles having an average particle diameter make up at least 50 percent of the particles in total, the maximum diameter is nearly twice the average particle diameter, and the minimum particle diameter is about ½ of the average particle diameter. The average particle diameter of a finer component (corresponding to a solute) included in each ultrafine particle (corresponding to a solvent) is preferably 0.01 to 0.05 μm.

The above ultrafine particles may be not only spherical but also defectively spherical. However, when the ultrafine particles have too small a diameter, the resultant film has too smooth an outermost surface, and no sufficient anti-reflection effect may be obtained. The average particle diameter is preferably not less than 0.05 μm. Meanwhile, when the average particle diameter is too large, the diffusion effect is too high, the resolution is decreased, and the film strength is decreased. Therefore, the average diameter is preferably not more than 0.1 μm. The typical combination of at least two kinds of the above ultrafine particles is a combination of an electrically conductive component with an anti-reflection component. The amount ratio of the electrically conductive component and the anti-reflection component differs to some extent depending upon manufacture conditions. However, the proportion of the electrically conductive component is preferably at least 10% (at least 0.1 in a volume ratio) of the total weight of the ultrafine particles. When the above proportion exceeds 50%, the anti-reflection function may be decreased, and therefore, the above proportion is required to be adjusted to not more than 50%. The electrically conductive component is sometimes referred to as "minor component", and the anti-reflection component, as "major component" hereinafter.

It is not clear how these components to constitute the ultrafine particles of the present invention form the particle product or whether these components necessarily form a constant form depending upon the kinds and performances of the components. The minor component in a particle form is sometimes included in the major component, and in this case, the average particle diameter of the particle formed of the minor component is 0.01 to 0.05 μm.

The combination of these components is not limited to the above-described combination. The point is that the ultrafine particles satisfy the two functional requirements. When the minor component is included in the major component as described above, such a state is comparable to a state in which the ultrafine particle(s) composed of the major component is (are) the sea and the ultrafine particles of the minor component are present like islands. Further, when not more than 10% by weight of fine particles which have an average particle diameter of 0.01 to 0.05 μm and are composed of an electrically conductive component or a combination of an electrically conductive component with an anti-reflection functional component are incorporated to the ultrafine particles of the present invention, there is obtained the same effect as that obtained by using the ultrafine particles of the present invention alone.

The maximum peak of the particle size distribution is preferably in the vicinity of the average particle diameter, the particles having an average particle diameter make up at least 50 percent of the particles in total, the maximum diameter is nearly twice the average particle diameter, and the minimum particle diameter is about ½ of the average particle diameter.

The particle diameter (average particle diameter) of the above ultrafine particles ($SiO_2$ particles in particular) is restricted in terms of the image resolution and the anti-reflection effect on external light. The lower limit is determined in view of the anti-reflection effect. When the particle diameter less than 50 nm (0.05 μm), it is difficult to obtain the intended anti-reflection effect. The upper limit is determined in view of the resolution. When the particle diameter exceeds 1 μm, the resolution is greatly decreased. The above range has been therefore determined as a range in practical use. The particle diameter is preferably 50 nm to 300 nm (0.05 μm to 0.3 μm) more preferably 100 nm (0.1 μm to 0.15 μm) to 150 nm (0.12 μm), yet more preferably about 120 nm.

When the ultrafine particles of $SiO_2$ are used, the effect thereof is observed as could be expected even if the amount of the ultrafine particles fixed is small. However, the amount of thereof per unit area is 0.01 to 1 mg/cm$^2$, preferably 0.1 to 0.3 mg/cm$^2$. These upper and lower limits are also determined for the same reasons for the above particle diameter, i.e., in view of the anti-reflection effect (lower limit) and the resolution (upper limit).

The proportion of each of the electrically conductive component (minor component) and the anti-reflection functional component (major component) varies to some extent depending upon the manufacturing conditions. The proportion of the electrically conductive component is preferably at least 10% by weight based on the total weight of the ultrafine particles (volume ratio of at least 0.1). When this proportion exceeds 50%, the anti-reflection effect may be degraded, and it is therefore required to adjust this proportion to not more than 50%. When an anti-reflection film formed from these ultrafine particles is used in an image display device, the electrically conductive component is preferably transparent. That is because such a component constitutes no obstacle against a light path.

It is not clear how these components to constitute the ultrafine particles of the present invention form the particle product or whether these components necessarily form a constant form depending upon the kinds and performances of the components. The minor component in a particle form is sometimes included in the major component, and in this case, the average particle diameter of the particle formed of the minor component is 0.01 to 0.05 $\mu$m.

Typical examples of the anti-reflection functional component include $SiO_2$ (silicon dioxide) and magnesium fluoride ($MaF_2$). Typical examples of the electrically conductive component include $SnO_2$ (tin oxide), indium oxide ($In_2O_3$) and $Sb_2O_3$ (antimony oxide). These electrically conductive components may be used in combination. The combination of two components is not limited to the combination of the above two components. The point is that the ultrafine particles satisfy the two functional requirements. When the minor component is included in the major component as described above, such a state is comparable to a state in which the ultrafine particle(s) composed of the major component is (are) the sea and the ultrafine particles of the minor component are present like islands. Further, when not more than 10% by weight of fine particles which have an average particle diameter of 0.01 to 0.05 $\mu$m and are composed of an electrically conductive component or a combination of an electrically conductive component with an anti-reflection functional component are incorporated to the ultrafine particles of the present invention, there is obtained the same effect as that obtained by using the ultrafine particles of the present invention alone.

The ultrafine particles used in the present invention can be usually produced from metal components. As an apparatus for the production of the ultrafine particles, there is employed an apparatus in which the anti-reflection functional component and the electrically conductive component are both vaporized by means of the heat source selected from arc, plasma (induction plasma and arc plasma), laser, electron beam, gas, etc., and the vaporized components are rapidly cooled to produce ultrafine particles, each of which contains a mixture of these components.

In the process for the production of the ultrafine particles by arc, provided by the present invention, there is used an oxygen gas or a mixed gas of an oxygen gas and an inert gas (helium gas, argon gas, etc.) as an atmospheric gas in the system, and arc is generated between raw materials for the ultrafine particles and a discharging electrode provided askew or at right angles with the raw materials to form ultrafine particles, each of which is a mixture of oxides of the raw materials.

More specifically, there may be used ultrafine particles producing apparatus using a laser, described in U.S. Pat. No. 4,619,691 and ultrafine particles generating apparatus using arc, described in U.S. Pat. Nos. 4,610,718 and 4,732,369.

Besides the above apparatus, the ultrafine particles can be naturally produced by a chemical method.

The ultrafine particles of the present invention can be produced without any problem by operating the above apparatus according to a conventional method. The ultrafine particles of a mixture of oxides can be produced from a mixture of at least two materials. In this case, when materials having nearly the same vaporization rate are mixed, there can be formed ultrafine particles having a concentration of oxides close to the composition ratio of the mixed materials.

The ultrafine particles of oxides are formed not only when the raw materials are metals but when the raw materials are also metal oxides. In this case, when the metal materials tend to easily form a component, ultrafine particles of the compound are formed. When the metal materials hardly tend to form a compound, ultrafine particles of one oxide and ultrafine particles of the other oxide are formed. Since an oxide having electrical conductivity and an oxide having an anti-reflection function usually do not form a compound, there is formed a mixture of ultrafine particles of one oxide and ultrafine particles of the other oxide.

Examples of the ultrafine particles having an infrared reflection function, an electromagnetic wave shielding function or a clear electrically conductive function include metal oxides such as $TiO_2$, $ZrO_2$, $SnO_2$ and $In_2O_3$ and mixtures of these. Preferred is $SnO_2$+10 wt. % $Sb_2O_3$ or $In_2O_3$+5 wt. % $SnO_2$, since this combination nation is excellent in electrically conductive properties and infrared reflection characteristics. The film thickness is preferably 0.2 to 0.5 $\mu$m, and the particle diameter is preferably 0.01 to 0.05 $\mu$m.

[Base plate, Substrate)

The material of the base plate or substrate is any one of glass, plastics, metals and ceramics, and may be in any form of a plate, a film, a cube and others. The present invention can be applied to plane and curved surfaces. Examples of the main component of the plastic plate include polyethylene, polypropylene, urethane, acryl, phenol, epoxy, melamine, nylon, polyimide, polycarbonate, butyl, epoxyphenol, vinyl chloride and polyester. The surface of the base plate on which a film of the ultrafine particles may not only be planar, but also has a curvature like a Braun tube. Further, a film of the ultrafine particles may be formed on one surface or both surfaces.

(Film of ultrafine particles)

The film of the present invention is composed mainly of the above ultrafine particles. In addition, when the material components of the above ultrafine particles are finer ultrafine particles (average particle diameter of 0.01 to 0.05 $\mu$m), a mixture of the ultrafine particles of the present invention with the finer ultrafine particles is also included in the scope of the present invention.

As a thin film, it is sufficient to form one layer of the ultrafine particles, any yet two layers of the ultrafine particles may be formed as required. The thin film preferably has a thickness of 0.1 to 0.2 $\mu$m. Whether the thin film is formed of one layer or whether it is formed of two layers, the film thickness is preferably not more than 0.3 $\mu$m.

The optimum mixing ratio of the electrically conductive component and the anti-reflection functional component is the same as that described concerning the production of the above ultrafine particles. The formation of a thin film of the mixed ultrafine particles of the electrically conductive component and the anti-reflection functional component can be carried out by coating a suitable amount of the ultrafine particles on a base plate. In view of operability and economical benefit, it is preferred to form one layer. The concaves formed among the ultrafine particles are preferably 0.05 to 0.1 μm deep. The distance between adjacent electrically conductive component particles is preferably not more than 0.05 μm.

The thin film is formed by dispersing the ultrafine particles of the present invention or a combination of the ultrafine particles with ultrafine particles as raw materials in a solution of $Si(OR)_4$ (in which R is an alkyl group) in an alcohol, applying the resultant solution onto a translucent image display plate, heating (firing) the applied surface to form a film of the ultrafine particles coated with an $SiO_2$ formed by hydrolysis of the $Si(OR)_4$. The $SiO_2$ which is a hydrolysis product from $Si(OR)_4$ also works as a binder since it penetrates gaps between the base plate and each ultrafine particle.

The "R" in the above $Si(OR)_4$ is preferably an alkyl group having 1 to 8 carbon atoms, particularly preferably an alkyl group having 1 to 5 carbon atoms. The $Si(OR)_4$ alcohol solution shows an increase in viscosity with an increase in the number of carbon atoms. Therefore, the alcohol in which the $Si(OR)_4$ is to be dissolved is suitably selected so as not to add to the viscosity in view of operability. The alcohol is generally selected from alcohols having 1 to 5 carbon atoms.

A salt of a metal belonging to the groups II and III of the periodic table may be incorporated to impart the above thin film with an antistatic effect. Typical examples of the salt include hydrochloride, nitrate and carboxylate of aluminum.

Further, when the solution for forming a thin film is prepared, water as a promoter for the hydrolysis of $Si(OR)_4$ and a mineral acid such as nitric acid as a catalyst may be incorporated.

The above-prepared alcohol solution may be coated by any one of a spinning method, a dipping method, a spray method and a combination of these. The heat treatment of the coated surface may be practically carried out at a temperature in the range of 50° to 200° C.

It is practical to form a clear electrically conductive film as an anti-reflection film. In this case, the clear electrically conductive film constitutes an undercoat for the anti-reflection film. In practical point of view, the thickness of the anti-reflection is preferably not more than 200 nm (0.2 μm), more preferably 5 to 50 nm (0.005 to 0.05 μm), although the thickness depends on raw materials for the film. The clear electrically conductive film is constituted of an electrically conductive metal oxide film formed from at least one of $SnO_2$, $In_2O_3$ and $Sb_2O_3$. Beside this, the clear electrically conductive film may be an electrical conductivity-imparted film produced by incorporating at least one of the above clear electrically conductive metal oxides and metal salts having hygroscopicity into an $SiO_2$ thin film.

The above metal salt having hygroscopicity, to be contained in the $SiO_2$ thin film, may be selected from inorganic acids such as hydrochlorides, nitrates, sulfates and organic acids such as carboxylates. Preferred are salts of metal elements belonging to the group II of the periodic table typified by magnesium and salts of metal elements belonging to the group III of the periodic table typified by aluminum. These metal salts absorb water in the atmosphere to reduce the electric resistance on the panel surface.

On the other hand, the electrically conductive metal oxide per se has electrical conductivity and it is therefore more preferred than the metal salts to reduce the electric resistance on the panel surface. When the contents of the above metal oxide and the metal salt in the $SiO_2$ are even small, their effects are observed to a certain effect. However, this content per unit area of the $SiO_2$ thin film is preferably 0.01 to 1.0 mg/cm$^2$, more preferably 0.15 to 0.3 mg/cm$^2$. The lower limit of the above content is determined in view of an effect on a decrease in the electrical conductivity, and the upper limit thereof is determined in view of strength of adhesion to the panel surface.

The electrically conductive undercoat film is required to have thin film properties which hardly influence the performance of the anti-reflection film formed thereon. The above film of the present invention satisfy this condition.

The step of forming the above clear electrically conductive film will be detailed below. Since the clear electrically conductive film is formed on the panel of a cathode ray tube (image display face plate), it is desirable to form it at such a temperature that does not exert a stress on a glass plate constituting the panel (not more than about 500° C.). Any method that satisfies this may be employed. Typical examples of the method of forming the clear electrically conductive film are described below.

i) The method of directly forming a film of the electrically conductive metal oxide of at least one of $SnO_2$, $In_2O_3$ and $Sb_2O_3$ on the glass panel includes (1) a method in which the metal oxide is used as a target and placed so as to face the panel surface in an sputtering apparatus, and the metal oxide film is formed on the panel surface by sputtering and (2) a method in which the metal oxide film is formed on the panel surface from an organic metal compound as a raw material by a known CVD method. In the above method (2), the organic metal compound includes alkyl metal compounds having the formula of $M(R)_m$ or alkoxy metal compounds having the formula of $M(OR)_m$ in which M is tin, indium or antimony, m is the valence of M, and R is an alkyl group (in which R=$CH_{2n+1}$ and practically n=1 to 5). Specific examples are $Sn(CH_3)_4$ and $Sn(OC_2H_5)_4$.

ii) The method of forming the clear electrically conductive film by incorporating an electrically conductive substance into the $SiO_2$ film will be explained below.

The $SiO_2$ film can be easily obtained by hydrolyzing alkoxysilane, $Si(OR)_4$, in which R is an alkyl group having 1 to 5 carbon atoms in practical point of view. In the present invention, at least one additive selected from clear electrically conductive metal oxides and metal salts having hygroscopicity, detailed in the above invention of the cathode ray tube to achieve the above first object, is added to an alcohol solution of $Si(OR)_4$, the resultant solution is applied on a panel surface, the panel surface is heated to hydrolyze the $Si(OR)_4$, whereby an $SiO_2$ film is formed. The amount of the above additive is preferably 0.05 to 7% by weight based on the alcohol solution, more preferably 1.0 to 2.0% by weight.

The above clear electrically conductive oxide is not dissolved in the above alcohol solution, but is merely dispersed therein, while the metal oxide is partially or wholly dissolved. The better the above additive is dispersed or dissolved in the above alcohol, the better the electrical conductivity of the resultant $SiO_2$ film is. In this point of view, it is preferred to incorporate a ketone such as acetyl acetone or ethyl cellosolve as a dispersant to the above solution. To ease the hydrolysis of $Si(OR)_4$, it is further preferred to add water and an inorganic acid such as nitric acid as a catalyst.

The alcohol solvent in which the above $Si(OR)_4$ is to be dissolved is preferably an alcohol which is derived from the alkyl, R. The most practical combination is where n=2 or R is ethyl, i.e., a combination of tetraethoxysilane $(OC_2H_5)_4$ and ethyl alcohol as a solvent.

The above alcohol is applied to the panel by a spinning method, a dipping method, a spray method or a combination of these.

The temperature for heat-treatment of the above applied surface for the hydrolysis of $Si(OH)_4$ to form a $SiO_2$ thin film is preferably in the range of 50° to 200° C., more preferably 160° to 180° C. Being carried out at a relatively low temperature as described above, the method of forming this electrically conductive $SiO_2$ thin film is more advantageous than the forming method in the above i). When this method is applied to a cathode ray tube such as a Braun tube, a Braun tube can be treated in the state of a completed tube, and therefore this method is suitable for a mass production process. This method may be naturally applied to the production process of a Braun tube before the completion of the tube.

In the method of obtaining the anti-reflection film by forming an uneven surface, the concavoconvex size is preferably about 0.1 μm, and the volume preferably changes continuously in the depth direction. Due to this, the refractive index continuously changes, and the anti-reflection effect can be obtained. In this case, when uniform $SiO_2$ fine particles having no particle size distribution are used, the fine particles adhere regularly, and no film of which the concavoconvex volume continuously changes in the depth direction is obtained. Therefore, little anti-reflection effect is obtained.

In contrast, when untrafine particles having a particle size distribution are used, the resultant film has proper pores, and as a result, the concavoconvex volume continuously increases in the depth direction. There is therefore obtained an anti-reflection effect. Further, when an $Si(OR)_4$ alcohol solution is used, substances other than Si in the $Si(OR)_4$ alcohol solution sublimate at about 150° C., and Si precipitates to form a film, which has an effect of bonding the glass and the $SiO_2$ ultrafine particles to each other firmly. On the other hand, acetyl acetone, acetone and ethyl alcohol which may be mixed with the $Si(OR)_4$ alcohol solution have an effect of diluting the $Si(OR)_4$ alcohol solution to control the film thickness of an Si precipitate.

In the present invention, a general chemical method of producing ultrafine particles may be applied to the production of the ultrafine particles of the present invention. In this case, the resultant particles are uniform, and it is therefore effective to employ a physical method such as an arc method to obtain ultrafine particles having a particle size distribution. In addition, a mixture system of electrically conductive particles ($InO_2$, $SnO_2$, etc.) and anti-reflection functional particles ($SiO_2$) is effective. However, when particles each of which has both properties (e.g., Si—In—O particles) are obtained instead of properties of different particles, such particles are not only free from a decrease in the electrical conductivity but also effectively achieve the anti-reflection effect.

The step of forming an anti-reflection film on the above clear electrically conductive film as an undercoat will be detailed below.

At first, alkoxysilane, $Si(OR)_4$, is dissolved in an alcohol. All of the $Si(OR)_4$ as a raw material and alcohols as a solvent are the same as those described concerning ii) the formation of the $SiO_2$ film as an undercoat of the clear electrically conductive film, and the explanation thereof is omitted.

$SiO_2$ fine particles having a particle diameter of 50 nm (0.05 μm) to 1 μm are dispersed in a solution of $Si(OR)_4$ in an alcohol, prepared in the same manner as in ii). In view of the anti-reflection effect and resolution, the amount of the above fine particles is preferably 0.1 to 10% by weight, more preferably 1 to 3% by weight. To improve the dispersibility of the $SiO_2$ fine particles and the hydrolyzability of $Si(OH)_4$, it is preferred to add a ketone such as acetyl acetone or ethyl cellosolve as a dispersant, and it is preferred to add water and an inorganic acid such as nitric acid as a catalyst.

The above $Si(OR)_4$ is hydrolyzed to form an $SiO_2$ thin film and work to the $SiO_2$ fine particles to the panel surface. When the above alkyl group, R, has the general formula of $C_nH_{2n+1}$, n is practically 1 to 5, preferably 2, or R is preferably ethyl. The alcohol in which the above $Si(OR)_4$ is to be solved is preferably an alcohol derived from the alkyl, R. The most practical combination is where n=2 or R is ethyl, i.e., a combination of tetraethoxysilane $(OC_2H_5)_4$ and ethyl alcohol as a solvent.

When the above $Si(OR)_4$ alcohol solution containing the $SiO_2$ dispersion is applied to the undercoat clear electrically conductive film formed on the panel, there is employed a spinning method, a dipping method, a spray method or a combination of these as is described concerning the formation of the electrically conductive $SiO_2$ thin film in the above ii).

The temperature for heat treatment of the above applied surface for the hydrolysis of $Si(OR)_4$ to form an $SiO_2$ thin film is preferably in the range of 50° to 200° C., more preferably 160° to 180° C.

The thin film as an anti-reflection material is formed by the above method. Since the above temperature for the above heat treatment is comparatively as low as that described concerning the method of the formation of the undercoat in ii), this method is suitable for forming the anti-reflection thin film on the panel surface of a completed cathode ray tube.

The anti-reflection film has fine uneven surface (submicron order) as described above, and such a film does not need the following treatment. However, when the anti-reflection film is formed of uniform ultrafine particles by a chemical production method, it is difficult to provide the film with such a fine uneven surface. The present inventor has therefore added an etching treatment to obtain a fine uneven surface.

In this case, when a binder having a higher etching rate than the ultrafine particles is used, the binder is gradually removed from the surface by etching in an etching liquid more actively than are the ultrafine particles. Thus, there is obtained an ultrafine particle film having an exact uneven surface in the submicron order. Depending upon etching conditions, the etching liquid is selected from a sodium hydroxide aqueous solution and a hydrogen fluoride aqueous solution. Since, however, hydrogen fluoride easily removes the ultrafine particles of $SiO_2$, etc., as well for a short time, and makes it difficult to control the step, a sodium hydroxide (e.g., 5% aqueous solution) is preferred. Even if a binder-fired decomposition product obtained after the etching with a sodium hydroxide aqueous solution contains $SiO_2$, the binder is the more actively removed in the etching liquid than the $SiO_2$ ultrafine particles.

Light reflection occurs in an interface where the refractive index changes sharply, and if the refractive index gradually changes in an interface, reflection no longer occurs. To prevent reflection from soda glass (refractive index, about 1.53), magnesium fluoride ($MgF_2$) having a lowest refractive index (about 1.38) is deposited thereon by sputtering, etc. However, since the refractive index sharply changes in an interface between a glass base plate and an $MgF_2$ film and in an interface between the $MgF_2$ film and air (refractive index, about 1.0), the anti-reflection effect is not sufficient. Therefore, a film of which the refractive index gradually changes from the value of a glass base plate to the value close to that of air efficiently gives an anti-reflection effect.

For the above reason, ultrafine particles of a substance having a refractive index between that of a glass base plate and that of $MgF_2$, e.g., $SiO_2$ (refractive index, 1.46) and ultrafine particles of $MgF_2$ are mixed, and the mixture is applied to a glass base plate. Further, the mixing ratio is changed in the film thickness direction. That is, the proportion of the $SiO_2$ is gradually decreased, and the proportion of the $MgF_2$ is gradually increased, from the glass base plate surface to the film surface, whereby the change in the refractive index in an interface between the coated surface and the glass base plate is moderately changed, and an efficient anti-reflection effect is achieved. According to this method, an anti-reflection film having a large area can be formed at a low cost.

The ultrafine particles of a substance having a refractive index close to that of a glass base plate (e.g., $SiO_2$) and the ultrafine particles of a substance having a refractive index close to that of air (e.g., $MgF_2$) are mixed, whereby these substances are mixed uniformly at a level smaller than the wavelength of light. Therefore, the mixture has an average refractive index corresponding to the volume ratio of $SiO_2$ and $MgF_2$. That is, in an ultrafine particle film obtained from the mixture of $SiO_2$ ultrafine particles and $MgF_2$ ultrafine particles, the average refractive index, n(X), in a position in the film thickness direction is represented by $n(X)=1.46\times V(s)+1.38\times\{1-V(s)\}$ wherein V(s) is a volume percentage of the $SiO_2$ ultrafine particles in the X position. Therefore, when the mixing ratio is changed in the film thickness direction, the refractive index accordingly changes, and the change in the refractive index in the interface between the glass base plate and the film changes moderately.

Further, films having changed mixing ratios are stacked, whereby there is obtained a film of which the average refractive index gradually changes as a whole.

As a solution, preferably used is a mixed solution containing an alcohol solution of $Si(OR)_4$ (in which R is alkyl having 8 or less carbon atoms, e.g., $C_2H_5$—) and at least one of acetyl acetone, acetone and ethyl alcohol.

In the method of forming an anti-reflection film on a glass surface, it is preferred to coat a solvent containing ultrafine particles having a particle size distribution of which the average particle diameter is not more than 0.1 $\mu$m, fire the coating, and then form an overcoat from a mixed solution containing an alcohol solution of $Si(OR)_4$ and at least one of acetyl acetone, acetone and ethyl alcohol. The anti-reflection film obtained as above is particularly suitable for an image display tube.

(Additive)

The additive is added, for example, for an antistatic purpose. Particles of a hydroscopic metal salt are used as such. Preferred is a salt of at least one metal element selected from metal elements belonging to the groups II and III of the periodic table. Practically usable are hydrochlorides, nitrates, sulfates and carboxylates, and at least one is selected therefrom. Particularly preferred are the above salts of at least one of magnesium and aluminum.

The above metal salts absorb water in the atmosphere to decrease the electric resistance on the base plate surface. Meanwhile, particles of electrically conductive metal oxide are more preferred than the above metal salts, since such particles per se have electrical conductivity and decrease the resistance on the base plate surface. As an oxide for such particles, practically used is at least one oxide selected from tin, indium and antimony. That is because these oxides constitute clear electrically conductive films. In addition, other known electrically conductive metal oxides, e.g., those having a perovskite structure may be naturally used. When the content of the above additive fixed is even small, its effect is observed to a certain effect. However, this contact per unit area of the base plate is preferably 0.01 to 1.0 $mg/cm^2$, more preferably 0.15 to 0.3 $mg/cm^2$. That is, the lower limit of the above content is restricted in view of an effect on a decrease in the electrical conductivity on the base plate surface, and the upper limit thereof is restricted in view of strength of adhesion to the base plate surface. That is, with an increase in the fixed content, the resistance value decreases, but the strength of adhesion decreases to the contrary.

(Pretreatment)

If the wettability to a base plate is considered, it is preferred to carry out a preliminary treatment with an alkali or fluorine.

(Application method)

The rising or lowering rate of the coating liquid is preferably not more than 10 mm/s. The base plate may be rested in a container, or the base plate surface is exposed through a hole provided on the side of a container. The latter is suitable for forming a ultrafine particle film on nearly completed product such as a Braun tube.

The coating liquid-applied surface is practically fired in a furnace at a temperature in the range of 50° to 200° C. It may be also fired by ultraviolet light from a high-pressure mercury lamp for a short time.

The above embodiment has been described by way of a dipping method. When the method of application on a plastic base plate or the uniformity of the film surface is not a critical matter, it is effective to employ another dipping method, a spinning method, a spray method or a combination of these instead of the above dipping method.

Further, it is effective to apply a coating solution composed mainly of ethyl silicate on the film of the ultrafine particles.

The film may be formed of one layer or at least two layers as required.

(Coating solution)

When the ultrafine particle film of the present invention is formed, there is used a coating solution which contains the predetermined ultrafine particles and the binder, and further contains a coupling agent and other additive as required.

When the translucent plate is a glass product, it is preferred to use $Si(OR)_4$ (in which R is alkyl) as a binder. When the translucent plate is a plastic, it is preferred to use $Si(OR)_x$ (in which x is 2 to 4, particularly preferably 3) as a binder. Further, when the translucent plate is a plastic material, it is preferred to use a coupling agent having a functional group which suits the plastic material.

When the translucent plate is a glass product, the ultrafine particles are dispersed in a solution of $Si(OR)_4$ (in which R is alkyl) in an alcohol. When the translucent plate is a plastic, the ultrafine particles are dispersed in a solution of a silane coupling agent having a functional group easily reactive to this polymer of the plastic and $Si(OR)_x$ (in which x is 2 to 4, particularly preferably 3) in an alcohol or in a solution of a mixture of the above $Si(OR)_4$ and a silane coupling agent in an alcohol.

The above solution is applied to a translucent plate and the applied surface is heated (or fired) to form a film. Due to this heat treatment, the above $Si(OR)_4$ or the silane coupling agent is decomposed to $SiO_2$, etc., to work as an adhesive between the ultrafine particles and the base plate.

The "R" in the $Si(OR)_4$ is preferably an alkyl group having 1 to 5 carbon atoms. Meanwhile, the silane-coupling agent is required to be suitably selected depending upon polymer materials of the translucent plate.

For example, when the translucent plate is formed mainly from polyethylene, polypropylene, urethane or acryl, a silane coupling agent such as vinyltriethoxysilane or γ-methacryloxypropyltrimethoxysilane is effective. When the plate is formed from phenol, epoxy, melamine, polyamide, polyimide or polycarbonate, a silane coupling agent such as γ-aminopropyltrimethoxysilane is effective. Further, when the plate is formed from butyl, epoxy phenol, vinyl chloride or polyester, a silane coupling agent such as β,3,4-epoxycyclohexylethyltrimethoxysilane or γ-glycidoxypropyltrimethoxysilane is effective.

The alcohol in which the $Si(OR)_4$ or the silane coupling agent is to be dissolved shows an increase in viscosity with an increase in the number of carbon atoms of the above R. In view of operability, therefore, the alcohol can be suitably selected so as not to increase the viscosity to excess. The generally usable alcohol is selected from alcohols having 1 to 5 carbon atoms.

Further, to impart the above film with an antistatic effect, a salt of a metal belonging to the groups II and III of the periodic table may be added to the coating solution.

Furthermore, to decompose the $Si(OR)_4$, water and a mineral acid such as nitric acid may be added when the coating solution is prepared.

(Anti-reflection film)

The anti-reflection film of the present invention is characterized in that a dispersion of ultrafine particles having an anti-reflection function is applied to a substrate to form a film having an uneven surface or a film of which the surface portion is at least porous, or that aggregates of ultrafine particles form nearly spherical fine particles of which the gaps form an uneven surface of fine particles.

In this case, it is preferred to form a film having a dispersion of ultrafine particles having an antistatic function in combination with the ultrafine particles having an anti-reflection function.

In the formation of the uneven surface, each of the concave portions of the ultrafine particles preferably has a diameter of not more than 0.05 μm, the concavoconvex portions are preferably present all over the surface formed of the ultrafine particles, and the porosity is preferably about 50%. In this case, the diameter of each of the ultrafine particles is preferably not more than a submicron unit (particularly, not more than 0.1 μm). These conditions also apply when the film surface is porous. When, however, aggregates each of which is formed of some ultrafine particles are formed, two methods are available for forming fine particles, and the resultant aggregates formed by any one of these two methods preferably have an average particle diameter of not more than 0.2 μm. In one method, "smaller" ultrafine particles are attached around each of relatively "larger" ultrafine particles (e.g., an average particle diameter of not more than 0.15 μm). In the other method, ultrafine particles having nearly the same particle diameter are aggregated.

In the anti-reflection film of the present invention, an ultrafine particle film is formed on a clear base plate from the ultrafine particles and a binder which is filled in gaps among the ultrafine particles, and a coupling agent having a functional group which suits a base plate material is allowed to present among the ultrafine particles and/or in an interface between the ultrafine particle film and the clear base plate. Further, it is preferred to apply a coating solution composed mainly of silicic acid onto the ultrafine particle film. Alternatively, without regard to the use of any coupling agent, it may be employed a method in which an ultrafine particle film is formed on the clear base plate from the ultrafine particles and a binder which is filled among the ultrafine particles, and a layer composed mainly of ethyl silicate is formed on the ultrafine particle film. As to the other procedures, the techniques on the clear base plate can be directly applied.

(Binder)

When the base plate is glass, $Si(OR)_4$ is used as a binder. When the base plate is a plastic, $R'Si(OR)_3$ wherein R' is a functional group usable for coupling and R is an alkyl group is used as a binder; said functional group should suit a plastic material. That is, when the plastic material is an acrylic resin, for example, γ-methacryloxypropyltrimethoxysilane can be used as a coupling agent. When it is an epoxy resin, γ-glycidoxypropyltrimethoxysilane is used.

(Application)

The technique for forming the anti-reflection film of the present invention shall not be limited to clear plates, image display plates, Braun tubes, etc., and can be naturally applied to opaque products, metal products, light-absorbing products, etc., unless these are outside the tenor of the present invention.

Examples of the apparatus and devices to which the present invention can be applied include (1) an image display plate produced by forming a film of the above ultrafine particles on the surface of a substrate, particularly a clear base plate, or applying the above clear plate or anti-reflection product to the surface of a substrate, particularly a clear base plate, (2) an image display protection plate having the same structure as that described in (1), (3) a Braun tube provided with a plate-like product described in (1) or (2), other cathode ray tubes, liquid crystal display devices, protection products such as window panels, and lenses.

The process for producing a Braun tube is as follows. For example, the clear base plate surface is exposed through an opening portion of a container, a mixed solution containing the ultrafine particles and the binder is introduced into the above container, and the solution level is elevated up or down on the base plate surface in the container at a constant rate to form an ultrafine particle film on the base plate surface.

The addition, the ultrafine particle film may be formed on each surface of the substrate or one surface thereof alone.

Embodiments in which the present invention has been applied to the front panel surface (glass face plate) of a Braun tube will be described hereinafter.

Figure 1:
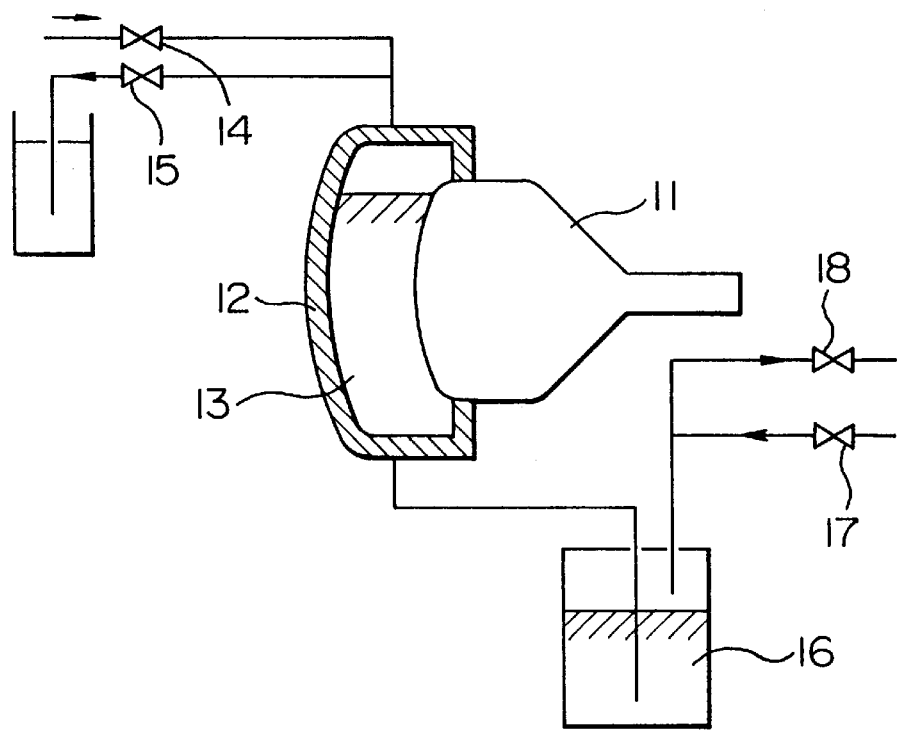
FIG. 1 is a layout drawing of a device of one embodiment of the present invention.

A first embodiment of the device of the present invention is shown in FIG. 1, in which numeral 11 indicates a Braun tube, numeral 12 indicates a coating solution bath, numeral 14 indicates a pressure-adjusting valve, numeral 15 indicates an overflowing valve, numeral 16 indicates a solution tank, numeral 17 indicates a solution feed pressure valve, and numeral 18 indicates a leaking valve.

In the above constitution, the coating solution bath 12 was attached to the Braun tube 11. In this embodiment, the attaching surface of the coating solution bath 12 was provided with a packing or an O-ring to prevent the leaking of the coating solution and a pressure gas during the application step. Further, in view of operability, the coating solution bath was also constituted so as to be sealed by merely inserting a Braun tube.

Then, the coating solution containing a mixture of ultrafine particles was introduced into a space formed between the coating solution bath 12 and the Braun tube face. For this introduction, the overflowing valve 15 and the solution feed pressure valve 17 were opened.

By the above procedure, the coating solution filled in the solution tank 16 was pressurized to fill it on the Braun tube face, and part of it was reflowed into an auxiliary tank through the overflowing valve 15, whereby contaminants, etc., adhering to the Braun tube face or a flow path were discharged together with the overflowed solution.

Thereafter, the overflowing valve 15 and the solution feed pressure valve 17 were closed, and the pressure-adjusting valve 14 and the leaking valve 18 were opened, whereby the coating solution 13 filled on the Braun tube face was charged back into the solution tank 16. In this case, due to the gas pressure applied to the pressure-adjusting valve 14 and the degree of open/close switching of the leaking valve 18, the lowering rate of the coating solution 13 on the Braun tube face was adjusted.

The mixing method for the preparation of the above coating solution will be described below.

Ethyl silicate [$Si(OC_2H_5)_4$] was dissolved in ethanol, and further, $H_2O$ for hydrolysis and $HNO_3$ as a catalyst were added to form a solution. Nearly spherical $SiO_2$ ultrafine particles having a diameter of 120 nm (0.12 $\mu$m) in an amount of 10% by weight and 2% by weight of $SnO_2$ ultrafine particles having a particle diameter of 6 nm were added to the above solution. The pH of the solution was adjusted so that the fine particles were fully dispersed.

Then, the above solution was filled on the Braun tube by the above method, and the solution level was lowered at a rate of 1.0 mm/s. Thereafter, the resultant coating was fired in air at 150° C. for 30 minutes to decompose the [$Si(OC_2H_5)_4$]. The $SiO_2$ ultrafine particles added to the solution were mutually bonded firmly and at the same time firmly bonded and fixed to the Braun tube face, since $SiO_2$ formed by the decomposition worked as a binder. In this method, a uniform and continuously uneven surface of the ultrafine particles could be formed on the Braun tube face.

Figure 2:
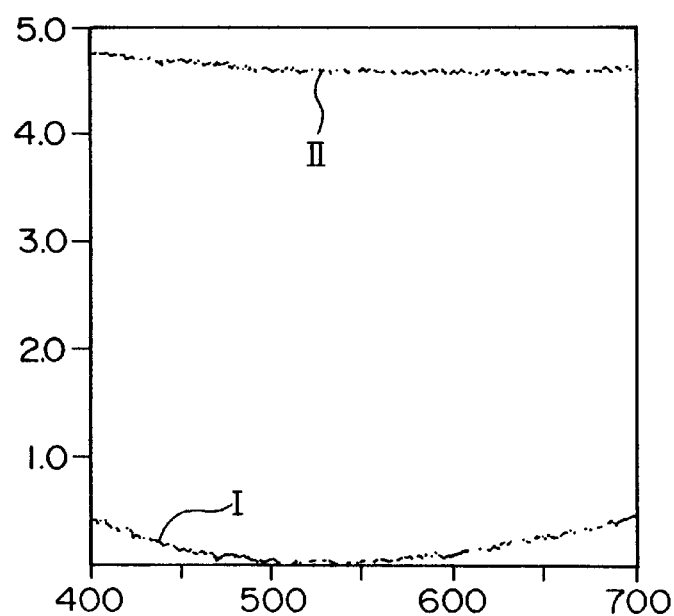
FIG. 2 shows reflectance characteristics of an anti-reflection film to which an ultrafine particle film of the present invention has been applied.

The Braun tube face having the above film formed was measured for a reflectance of light at an incident angle of 5° to give a low reflectance of 0.08% at a wavelength of 550 nm (0.55 $\mu$m) as shown in FIG. 2. In this case, when the Braun tube face was inspected from the side askew to the incident light, a phenomenon of opacification, i.e., Tyndall phenomenon, was not observed.

Figure 3:
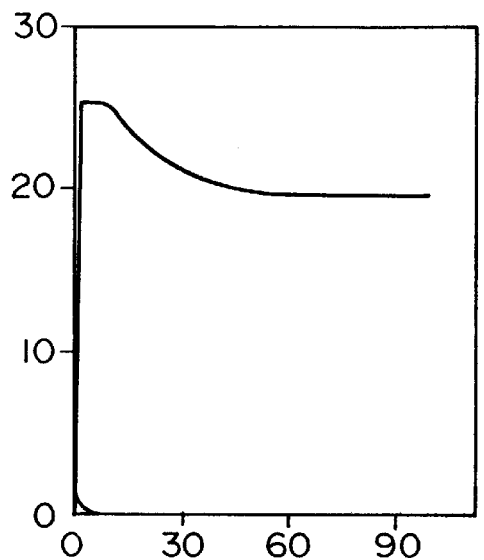
FIG. 3 shows antistatic characteristics of an antistatic film to which an ultrafine particle film of the present invention has been applied.
Figure 4:
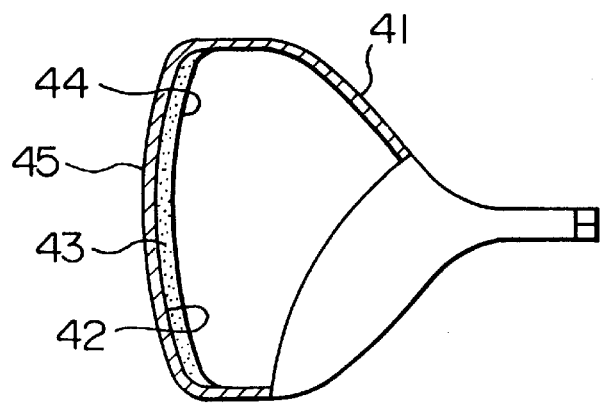
FIG. 4 is a cross-sectional view of a cathode ray tube as one embodiment to which the present invention has been applied.
Figure 5:
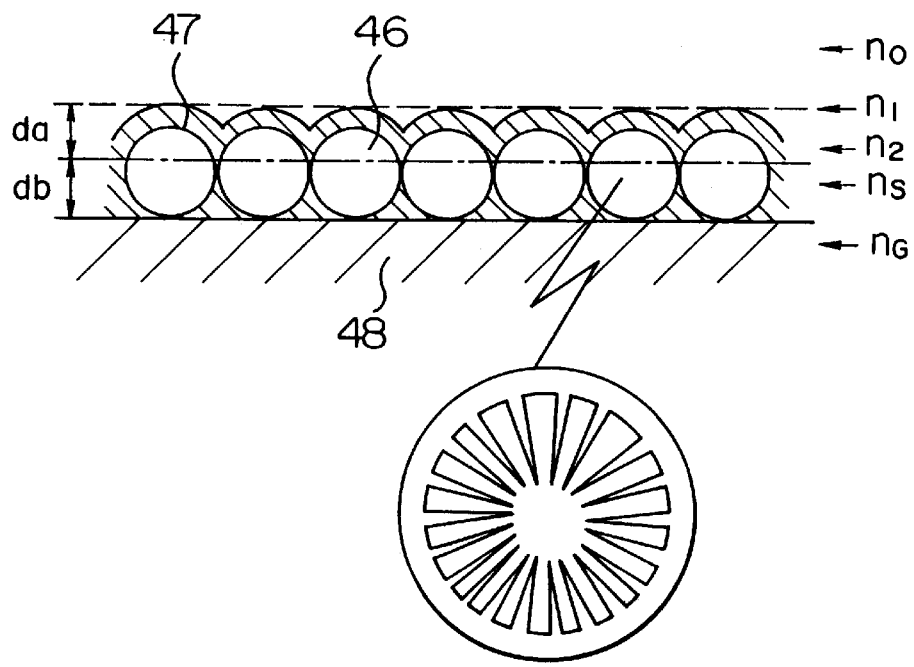
FIG. 5 is a schematic cross-sectional view of one embodiment of the ultrafine particle film of the present invention.

On the other hand, the above film was measured for a surface resistance value to show $16^6$ $\Omega/cm^2$, and the antistatic characteristic of the film was as shown in FIG. 3, which shows that almost no charge appeared as compared with a conventional characteristic as a reference.

Then, the antistatic low-reflection film of the present invention was rubbed with a rubber eraser (50-50 type, supplied by Lion Corp.) 50 times under a load of 1 kg. The reflectance changed by about 0.1%, and there was therefore no problem on its quality.

Ultrafine particles having a diameter of 300 nm i(0.3 $\mu$m) in an amount of 10% by weight based on the total amount of ultrafine particles were added to the above solution, and the solution was applied in the same manner as above. The resultant film showed no change in the anti-reflection effect and the antistatic effect, while its reflectance changed by 0.02% after the same test with the same rubber eraser. Thus, this film had higher strength against mechanical abrasion. This was because the "larger" ultrafine particles insularly dispersed in the film worked as a barrier.

In the above process for forming an antistatic and anti-reflection film, a film can be directly formed on a completed Braun tube, and all the remaining procedures are to mixing $SiO_2$ ultrafine particles and $SnO_2$ ultrafine particles in an existing $Si(OR)_4$ alcohol solution, apply it and fire the resultant coating. Thus, the above process obviates the use of harmful chemicals such as hydrofluoric acid, etc., and gives products having a constant quality at a low cost.

The above embodiment has used $Si(OR)_4$ in which R was ethyl. However, as described earlier, $Si(RO)_4$ wherein R is $C_nH_m$ (m=2n+1) may be used in the range of n=1 to 5. With an increase in n, the viscosity of the solution increases a little. Therefore, an alcohol compatible with the increase can be selected as a solvent in view of operability.

According to this embodiment, a film having excellent anti-reflection effect and antistatic function can be formed on an image display plate at one application step as described above. Further, the face plate of the present invention obviates the use of harmful chemicals such as hydrofluoric acid, etc., can be produced by a simple and safe process, and is suitable for mass-production and also excellent in contamination durability.

Another embodiment will be described by reference to FIG. 7.

Figure 7:
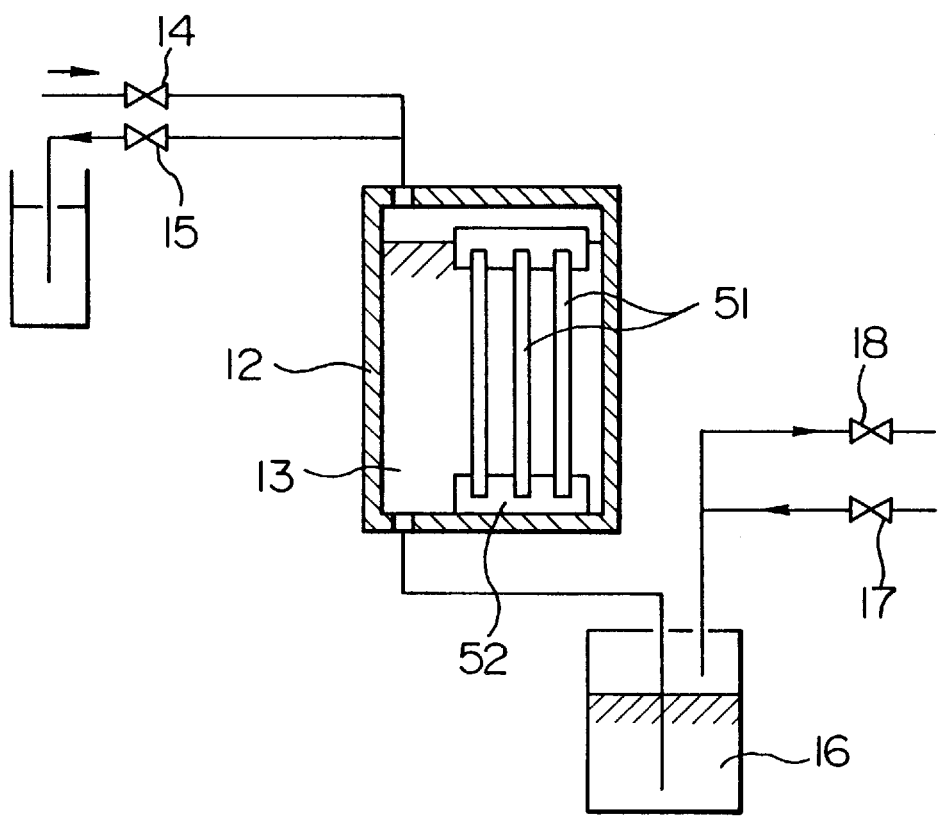
FIG. 7 shows a layout drawing of other embodiment of the present invention.

Another embodiment is shown in FIG. 7, in which numeral 51 indicates a plurality of clear base plates which are rested on a tool 52 and encased in a coating solution bath 12. The clear base plate of the Braun tube of the above first embodiment has been a glass plate, while the clear base plate 51 was a plastic plate.

In this embodiment, the attaching surface of the coating solution bath 12 was provided with a packing or an O-ring to prevent the leaking of the coating solution and a pressure gas during the application step. Then, the coating solution containing a mixture of ultrafine particles was introduced into the coating solution bath 12. For this introduction, an overflowing valve 15 and a solution feed pressure valve 17 were opened. By the above procedure, a coating solution 13 filled in a solution tank 16 was pressurized to fill it in the coating solution bath 12, and part of it was reflowed into an auxiliary tank through the overflowing valve. Then, the overflowing valve 15 and the solution feed pressure valve 17 were closed, and a pressure-adjusting valve 14 and a leaking valve 18 were opened, whereby the coating solution 13 was charged back to the solution tank 15. In this case, due to the gas pressure applied to the pressure-adjusting valve 14 and the degree of open/close switching of the leaking valve 18, the lowering rate of the coating solution 13 on a plurality of the clear base plates was adjusted.

The mixing method for the preparation of the above coating solution will be described below.

Ethyl silicate [$Si(OC_2H_5)_4$] containing γ-methacryloxypropyltrimethoxysilane was dissolved in ethanol, and further, $H_2O$ for hydrolysis and $HNO_3$ as a catalyst were added to form a solution. Nearly spherical $SiO_2$ ultrafine particles having a diameter of 120 nm (0.12 $\mu$m) in an amount of 10% by weight and 2% by weight of $SnO_2$ ultrafine particles having a particle diameter of 6 nm (0.006 $\mu$M) were added to the above solution. The pH of the solution was adjusted so that the fine particles were fully dispersed.

Then, the above solution was filled in the coating solution bath 12, and the solution level was lowered at a rate of 1.0 mm/s. Thereafter, the resultant coating was fired in air at 150° C. for 30 minutes to decompose the ethyl silicate. The $SiO_2$ ultrafine particles added to the solution were mutually bonded firmly and at the same time firmly bonded and fixed to the Braun tube surface, since $SiO_2$ formed by the decomposition worked as a binder. In this method, a uniform and continuously uneven surface of the ultrafine particles could be formed on the Braun tube surface.

(Ultrafine particles-applied device)

The device for which the thin film of the present invention exhibits its best effects includes an image display face formed on a translucent base plate such as the above thin film glass base plate or an anti-reflection film, and a cathode ray tube into which this image display face plate has been integrated.

The amount of the fixed ultrafine particles of the present invention (particularly when $SiO_2$ is used as an anti-reflection functional component) is preferably 0.01 to 1 mg/cm$^2$, more preferably 0.1 to 0.3 mg/cm$^2$.

In the ultrafine particles-applied device as above, the electrically conductive component is preferably transparent. That is because such a component constitutes no obstacle against a light path.

(Others)

When a thin film is formed from composite ultrafine particles formed from two components, the function of the minor component continues to be active as a function of the main (major) component. The effect of remaining finer ultrafine particles (an included component) is exhibited due to a tunnel effect, although the distance among the finer ultrafine particles is large in view of the distance among the ultrafine particles but is not as large as the size of each ultrafine particle.

Concerning the function of the component formed from the minor component and included in an ultrafine particle in the form of a finer ultrafine particle, there is a distance between one finer ultrafine particle and another finer ultrafine particle included in an adjacent ultrafine particle, but the distance is not greater than the ultrafine particle. Therefore, a tunnel effect is exhibited in terms of electrical conductivity. In this case, the major component achieves the function of low reflection mainly because of its surface roughness necessarily produced due to its viscosity. The electrically conductive component exhibits electrical conductivity due to its tunnel effect. The thin film formed from composite ultrafine particles shows higher strength than a film formed of a laminate of functional components since the peeling site decreases in number. Further, it also shows an improvement in conjunction of two functions since a tunnel effect is utilized as compared with a mixture of ultrafine particles each of which has a different function.

When the main ultrafine particles are formed from a component having an anti-reflection function, a low reflection function is achieved mainly due to its surface roughness. The electrically conductive component exhibits electrical conductivity due to a tunnel effect. The film strength is improved further than a film of a laminate of functional components since the peeling site (potential) decreases in number. Further, the film formed above also shows an improvement in conjunction of two functions since a tunnel effect is utilized as compared with a mixture of ultrafine particles each of which has a different function.

In another method, in the case of one layer of an anti-reflection functional film (which means the absence of electrical conductivity and mixing of no electrically conductive particles), an $SiO_2$ thin form formed by hydrolysis of $Si(OR)_4$ coats the uniformly dispersed $SiO_2$ fine particles and fixed them to a glass (base plate) surface. This film is subjected to an etching treatment as described above. Due to this uniformly dispersed $SiO_2$ fine particles, the anti-reflection effect and the high resolution of a displayed image are maintained. Further, the $SiO_2$ film contains an additive, i.e., at least one of a hygroscopic metal salt and an electrically conductive metal oxide. The former retains hygroscopicity after the heat treatment for hydrolysis of $Si(OR)_4$ (this heat treatment improves the film strength), and works to decrease the resistance value on the base plate surface without losing its performance.

The function of the treatment for electrical conductivity is as follows. That is, due to the electrically conductive oxide, there is observed a decrease in a surface resistance value, which is based on the same principle as that of the clear electrically conductive film. The surface resistance value being low, the antistatic function is retained. As described above, the additive used in the present invention exhibits an antistatic effect. In view of decreasing of the surface resistance value of the base plate, an electrically conductive metal oxide is excellent over a metal salt. Above all, oxides of tin, indium and antimony are preferred in that the film transparency is excellent and that high resolution of an image can be also maintained. Differing from oxides, some metal salts are fixed in a film in a dissolved state. In this case, the film transparency is excellent, and such metal salts have a function to maintain high resolution.

An electrically conductive film used as an undercoat exhibits the following functions.

The clear electrically conductive undercoat film tightly adheres to the panel surface and produces a function and effect of decreasing the electric resistance on the panel surface. In a film composed of a metal oxide which itself has electrical conductivity or a film which has a structure in which an electrically conductive metal oxide is dispersed in an $SiO_2$ film, there is observed a decrease in the surface resistance based on the same principle as that of a so-called clear electrically conductive film. Due to this, the antistatic function is maintained.

On the other hand, in the $SiO_2$ thin film containing a metal salt, the film is imparted with electrical conductivity since the metal salt absorbs and retains water. Even after the heat treatment for hydrolysis of $Si(OR)_4$ (this heat treatment improves the film strength), the metal salt maintains hygroscopicity and has a function to decrease the resistance value on the panel surface without loosing its performance.

As an additive incorporated into the $SiO_2$ film, an electrically conductive metal oxide is excellent over a metal salt in view of decreasing the resistance value on the panel surface. Above all, oxides of tin, indium and antimony are preferred in that the film transparency is excellent and that high resolution of an image can be also maintained. Differing from oxides, some metal salts are fixed in a film in a dissolved state. In this case, the film transparency is excellent, and such metal salts have a function to maintain high resolution.

In addition, the front panel (image display face plate) of a cathode ray tube such as a Braun tube is electrostatically charged for the following reason. A thin and uniform aluminum film 4 is deposition-formed on a phosphor applied to the inner surface of a Braun tube. When a high voltage is applied to the aluminum film, a phenomenon of an electrostatic charge occurs on the front panel of the Braun tube due to electrostatic induction.

Ultrafine particles (mainly $SiO_2$ having an anti-reflection function) are dispersed in an alcohol solution of $Si(OR)_4$ (in which R is alkyl), and after the solution is applied onto a base plate, the applied surface is heated (fired) to decompose $Si(OR)_4$ and form a film in which an ultrafine particle film is coated with $SiO_2$. $SiO_2$ which is a decomposition product from $Si(OR)_4$ penetrates gaps among the ultrafine particles and a gap between the ultrafine particles and the base plate and works as a binder.

The thin film obtained by the above method is etched by a dry or wet method for a very short time (from rich few seconds to several tens seconds), whereby the layer rich in $SiO_2$ which is a decomposition product on the film surface is etched to form etching grooves among the ultrafine particles. In this manner, a fine concavoconvex form at a ultrafine particle level is formed on the entire surface of the film to exhibit the anti-reflection function.

The above alcohol solution is applied to the base plate by a spin coat method, a dipping method or a spray method, whereby a large area can be treated easily at a low cost. For the etching after the firing, there is employed a method of immersion in an NaOH aqueous solution, whereby a large area can be treated easily at a low cost. Since the film is formed from the ultrafine particles, a fine uneven surface is formed, and the anti-reflection effect is further improved. The formation of the anti-reflection film by a coating method obviates an expensive vacuum deposition apparatus, a film having a larger area can be formed, and the cost can be decreased.

Reflection of light occurs in an interface where the refractive index changes sharply. Therefore, when the refractive index gradually changes, no reflection occurs. A film imparted with a refractive index distribution on the basis of the above principle is the above-described heterogeneous film.

When a base plate has a concavoconvex form which is smaller than the wavelength of light, each unit of the concavoconvex form is not regarded as an interface, and it is regarded as a plane having an average refractive index corresponding to a volume percentage of the base plate and air. That is, the average refractive index, $n_x$, in a position, x, in the film thickness direction is represented by $n_x = n_z \cdot v(x) + n_a(1 - v(x))$ in which $v(x)$ is the volume percentage of the base plate, $n_S$ is the refractive index of the base plate and $n_a$ is the refractive index of air. Therefore, when volume percentage $v(x)$, is continuously changed by forming a fine uneven surface, the refractive index is also continuously changed, and a heterogeneous film is formed, whereby the reflection can be prevented.

When the ultrafine particle film is etched, a concavoconvex form having a size equal to, or smaller than, the ultrafine particles is formed, and a heterogeneous film is formed, which works as an effective anti-reflection film. A concavoconvex forming treatment of ultrafine particles, formation of a porous surface, and aggregation of ultrafine particles to form fine particles also similarly work.

(Devising of anti-reflection function ultrafine particles per se)

Embodiments of the anti-reflection function ultrafine particles are described by reference to FIG. 8.

FIG. 8(*a*) shows a porous surface. The diameter of each pore is not more than 0.05 μm, the porosity is about 50%, and the pores are formed (nearly uniformly) on an entire spherical surface. The entire spherical form preferably has an average diameter of not more than 0.1 μm. As one of the methods for forming a porous surface, a core growth method is available. In this case, the mixing ratio of an alkoxide-water-acid-alcohol starting material is changed, and the hydrolysis and polymerization are nonuniformly carried out, or the reaction proceeds at a higher rate, whereby portions having a high water content are formed in each particle. These particles are fired to evaporate water, whereby porous particles are formed in which pores have been left.

FIG. 8(*b*) shows an aggregate formed by attaching "smaller" ultrafine particles around a relatively "larger" ultrafine particle (having a radius of not more than 0.15 μm in this case), and the aggregate as a whole preferably has an average diameter of not more than 0.2 μm. In this case, the aggregates are formed by mixing A and B in the Figure in a suitable mixing ratio and activating the surface of A by mechanical friction to allow the surface to adsorb B (technical fusion).

FIG. 8(*c*) is a variation of the above (b) type. For example, a solution of $SiO_2$ ultrafine particles which are alone dispersed is subjected to a further reaction of the ultrafine particles to give a solution containing a large amount of secondary aggregates. The reaction mixture is dried, and mechanically pulverized to give secondary aggregates having a predetermined size. The aggregates also preferably have an average particle diameter of not more than 0.2 μm.

FIGS. 8(*d*) and 8(*e*) are perspective views of the (b) and (c) types. FIG. 8(*d*) shows an embodiment of one aggregate of ultrafine particles having a diameter of not more than 0.05 μm. FIG. 8(*e*) shows an embodiment of one aggregate of ultrafine particles having a diameter of not more than 0.1 μm. These aggregates themselves also preferably have an average particle diameter of not more than 0.2 μm.

(Embodiment of formation of two-layered film)

Figure 9:
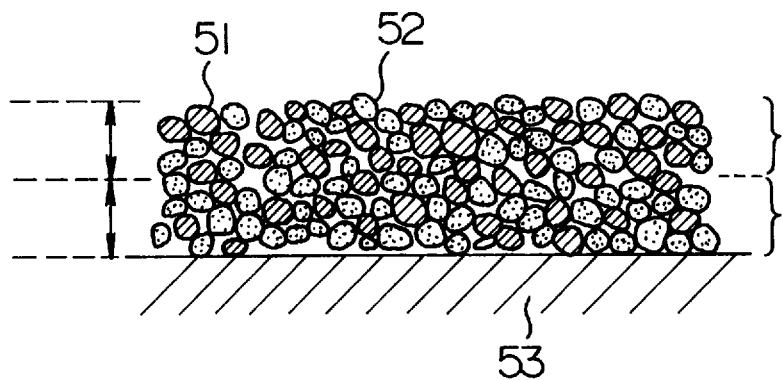
FIG. 9 is a cross-sectional view of one embodiment of the anti-reflection film of the present invention.
Figure 10:
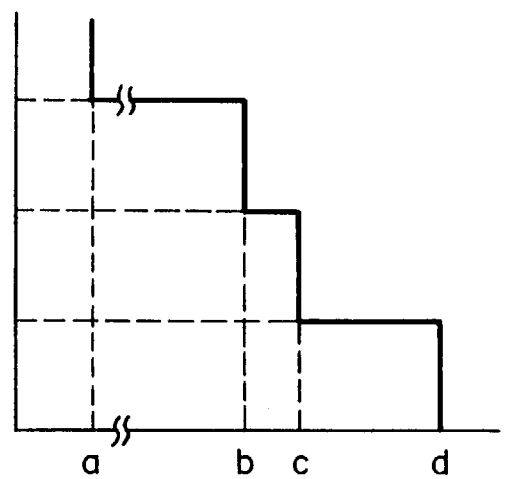
FIG. 10 shows characteristics of a change in refractive index in the film thickness direction of an anti-reflection film.

FIG. 9 is a cross-sectional view of one embodiment in which two-layered ultrafine particle film of the present invention is formed. FIG. 10 shows a change in an average refractive index of the above ultrafine particle film in the film thickness direction. The ultrafine particles have a form of any one of the embodiments shown in FIG. 8.

At first, ethyl silicate, $[Si(OC_2H_5)_4]$, was dissolved in ethanol, and further, water, isopropyl alcohol and acetyl acetone were added to form a solution. Then, $SiO_2$ ultrafine particles were added to the solution and fully dispersed by supersonic vibration. The $SiO_2$ ultrafine particles were used in an amount of 1 wt. % in the above solution. After the dispersion of the $SiO_2$ ultrafine particles, citraconic acid was added and fully dissolved. The citraconic acid was used in an amount of 0.4 wt. % in the above solution. Thereafter, the mixture was further subjected to supersonic vibration to fully disperse the $SiO_2$ ultrafine particles and fully mix all the components. The resultant solution is referred to as "solution A".

A solution B, which had been preliminarily prepared by dispersing $MgF_2$ ultrafine particles and ethyl silicate in ethanol, was added to the above solution A, and these were fully mixed by supersonic vibration. The amount of the $MgF_2$ ultrafine particles in the solution B was about 1 wt. %. The mixing ratio of the solution A and the solution B was varied to change the mixing ratio of the $SiO_2$ ultrafine particles and the $MgF_2$ ultrafine particles.

A solution having an $SiO_2$ ultrafine particle/$MgF_2$ ultrafine particle volume ratio of 7/3 prepared by changing the mixing ratio of the solution A and the solution B was dropped on a glass plate surface, and applied uniformly with a spinner. Then, the solution-coated glass plate was kept in air to 40° C. for about 10 minutes to dry the film. After it was dried, a solution having an $SiO_2$ ultrafine particle/$MgF_2$ ultrafine particle volume ratio of 1/1 was dropped, and applied uniformly with a spinner. Thereafter, the glass solution-coated glass plate was fired in air at 160° C. for 45 minutes to pyrolyze the ethyl silicate to form $SiO_2$. The $SiO_2$ ultrafine particles and $MgF_2$ ultrafine particles were firmly fixed on the glass base plate due to the $SiO_2$ formed by pyrolysis.

The cross section of the above-formed ultrafine particle film was microscopically observed to show a film formed as shown in FIG. 9, which had a total thickness of about 0.2 μm and formed of a layer (first layer) having an $SiO_2$ ultrafine particles 52/$MgF_2$ ultrafine particles 51 volume ratio of 7/3 and having a thickness of about 0.1 μm and a layer (second) layer having the above ratio of 1/1 and having a thickness of about 0.1 μm. The $SiO_2$ ultrafine particles and the $MgF_2$ ultrafine particles were uniformly mixed and densely deposited. Numeral 53 indicates the glass base plate.

The change in the average refractive index of the above-obtained ultrafine particle film in the film thickness direction was calculated on the basis of the $SiO_2$ ultrafine particles/ $MgF_2$ ultrafine particles volume ratio, and the result is shown in FIG. 10, in which a indicates the refractive index of air, i.e., about 1.0, b indicates the refractive index of the first layer, i.e., about 1.42, c indicates the refractive index of the second layer, i.e., 1.44, and d indicates the refractive index of soda glass, i.e., about 1.53. The refractive index of the entire film gradually changed, which produced an effect of decreasing the reflectance in the interface between the film and the glass base plate. Further, the film was formed from the ultrafine particles and a fine uneven surface was therefore formed. As a result, the reflection on the film surface was decreased.

Figure 11:
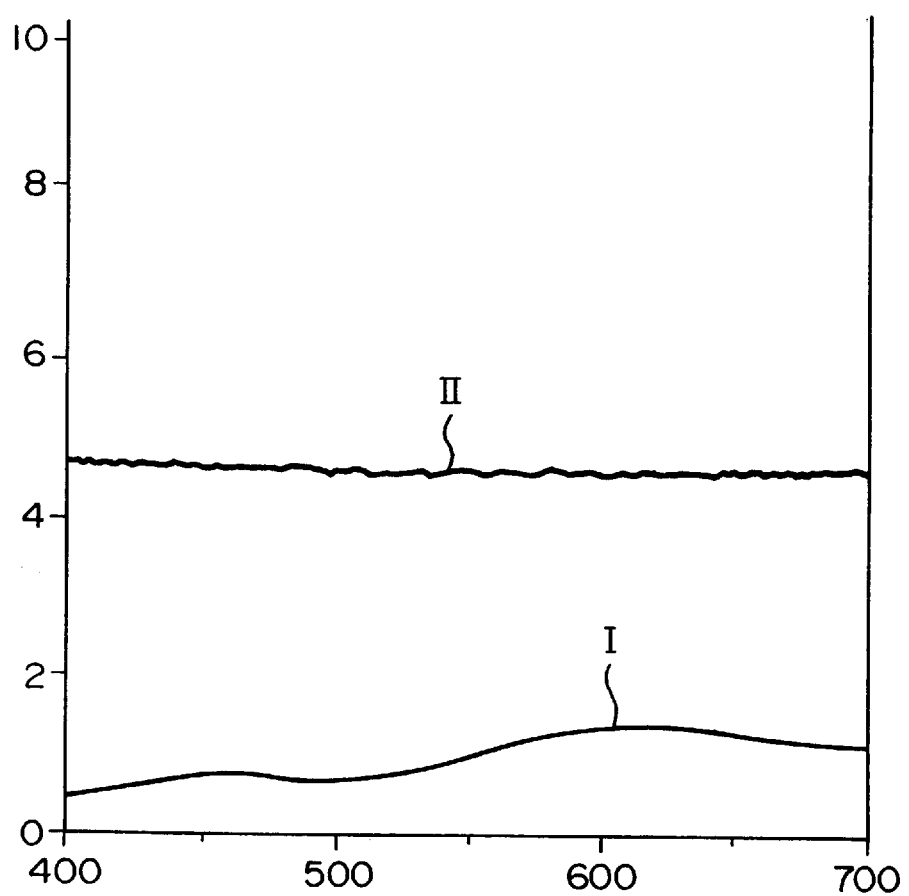
FIG. 11 shows characteristics of reflectance of one embodiment of the anti-reflection film of the present invention and reflectance of an untreated glass plate at a wavelength of 400 to 700 nm.

The above glass base plate on which the ultrafine particle film was formed and an untreated glass base plate were measured for reflectance of light having a wavelength of 400 to 700 nm at an incident angle of 5°, and the results are shown in FIG. 11, in which 1 indicates the reflection characteristic of the above glass base plate and 11 indicates that of the untreated glass base plate.

The reflectance of the anti-reflection film of the present invention is decreased to about ¼ of that of the untreated glass base plate in the entire wavelength region. As to the transmittance shown as an integral value in the wavelength region of 400 to 700 nm, the untreated glass base plate showed a transmittance of 92%, while the glass base plate on which the anti-reflection film of the present invention was formed showed about 80%. Thus, the anti-reflection film of the present invention shows low reflection in the entire visible light region and high transmittance. Therefore, the anti-reflection film of the present invention is suitable as an anti-reflectance for VDT (visual display terminal).

In the above embodiment, the film was formed of two layers having different mixing ratios. When the average refractive index is changed more gradually by forming a film having more layers, the anti-reflection effect is more improved.

According to the above embodiment, a film of which the refractive index continuously changes can be formed by repeating a simple application method. Therefore, the anti-reflection can be formed at a low cost. Further, there is an effect that an anti-reflection film having a large area can be easily produced.

(Embodiment of ultrafine particles each of which contains a mixture of components)

Figure 12:
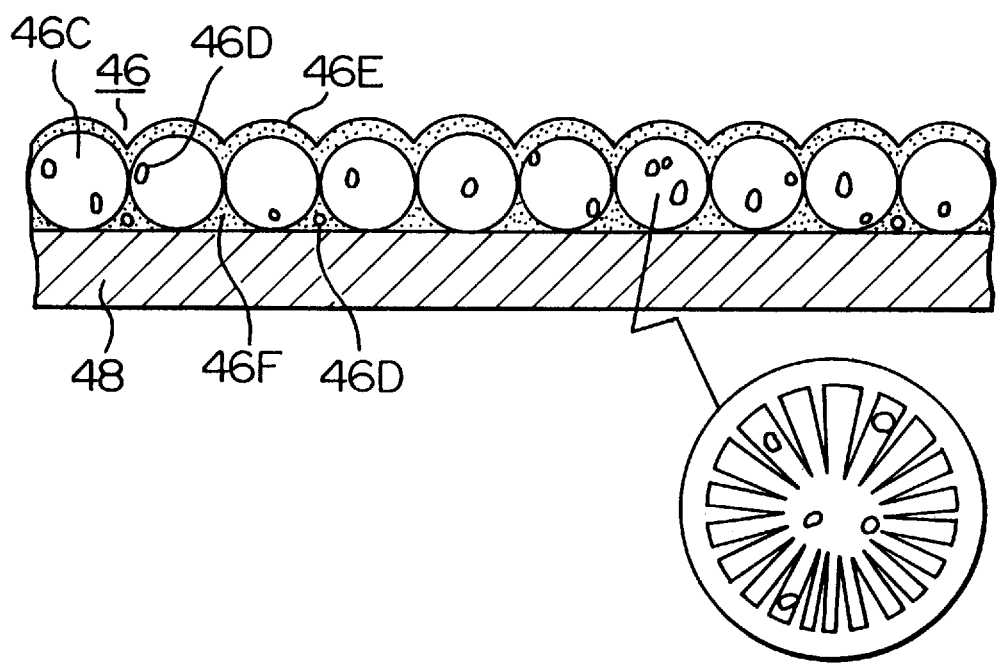
FIG. 12 is a cross-sectional view of one embodiment of the present invention.

FIG. 12 is a cross-sectional view of an anti-reflection film formed on a glass base plate.

In this embodiment, an ultrafine particle film formed of one layer is formed on a glass base plate 48. The ultrafine particle film is composed mainly of ultrafine particles 46, and each ultrafine particle is a mixture of an electrically conductive component 46D and an anti-reflection function component 46C. Further, each particle has a porous surface as shown in a partially taken, enlarged view (other patterns shown in FIG. 8 are also usable). The electrically conductive component 46D constitutes what is called finer ultrafine particles, and these finer ultrafine particles may be also present outside each ultrafine particle 46. These ultrafine particles are coated with an $SiO_2$ thin film 46E. However, the present invention shall not be limited to this embodiment. That is, the ultrafine particles may be exposed without being coated with an $SiO_2$ film. Formed in gaps between each ultrafine particle and the glass base plate 48 is an $SiO_2$ filled portion 46F.

The $SiO_2$ thin film 46E and the $SiO_2$ filled portion are formed of a decomposition product of $Si(OR)_4$ obtained by firing.

In this embodiment, $SiO_2$ is used as an electrically conductive component, and $SiO_2$, as an anti-reflection function component. The $SnO_2/SiO_2$ volume ratio is from 0.1 (10%) to 0.5 (50%). In this case, the amount ratio of the electrically conductive component in each ultrafine particle is from 1% by weight to 50% by weight, and this amount ratio is calculated without the $SiO_2$ thin film 46 and the $SiO_2$ filled portion.

Further, the distance between adjacent ultrafine particles is required to be a distance in which one electrically conductive component contained in one ultrafine particle and the other electrically conductive component contained in an adjacent ultrafine particle are positioned so that a tunnel effect is exhibited. Such a distance is preferably not more than 0.05 μm.

The average particle diameter of the ultrafine particles (thickness of one layer) is not more than 0.1 μm. Therefore, the thickness of the thin film may be 0.1 to 0.2 μm. In this case, the depth of a dent formed in the thin film is usually 0.05 to 0.2 μm (the height of a dent is 0.05 to 0.2 μm when the ultrafine particles are coated with an $SiO_2$ thin film).

The $SiO_2$ which is a decomposition product from $Si(OR)_4$ penetrates the gap between the ultrafine particles and the thin film. Therefore, it also works as a binder.

The reason for high mechanical strength of the anti-reflection film of this embodiment is considered as follows. The $SiO_2$ film which is formed by the following hydrolysis is present and works as a protection film.

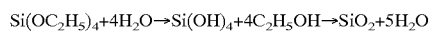

$$Si(OC_2H_5)_4 + 4H_2O \rightarrow Si(OH)_4 + 4C_2H_5OH \rightarrow SiO_2 + 5H_2O$$

A fine, regular and uniform uneven surface is formed on a flat plate from the ultrafine particles of the present invention. Therefore, an excellent anti-reflection effect is obtained on the entire film surface, and a decrease in the resolution due to an unnecessary uneven surface no longer occurs.

(Embodiment of formation of thin film)

The following is an embodiment in which the present invention was applied to the front panel (glass face plate) of a Braun tube.

Tetraethoxysilane, $[Si(OC_2H_5)_4]$, was dissolved in ethanol, and water ($H_2O$) for hydrolysis and nitric acid ($HNO_3$) as a catalyst were added to prepare an alcohol solution. Ultrafine particles 1 (having a nearly spherical particle form) prepared in the same manner as in the above embodiment were added to the above alcohol solution at a rate of 1. At the same time, a suitable amount of acetyl acetone was also added as a dispersant.

Before the ultrafine particles 1 were added to the above alcohol solution, various additives shown in Table 1 were also added in predetermined amounts.

TABLE 1

| Item | Embodiment | | | | |
|---|---|---|---|---|---|
| | 2 | 3 | 4 | 5 | 6 |
| Mixed solution wt. % | | | | | |
| Alcohol solution of $Si(OC_2H_5)_4$ in ethanol | 50 | 50 | 50 | 50 | 50 |
| Additive | | | | | |
| $Al(NO_3).9H_2O$ (nitrate) | 0.5 | 0.5 | — | — | — |
| $AlCl_3$ (hydrochloride) | — | 0.2 | — | — | — |
| $Al_2O(CH_3COO)_4 4H_2O$ (carboxylate) | — | — | 0.7 | — | — |
| Dispersant | | | | | |
| Acetyl acetate | 50 | 50 | 50 | 50 | 50 |
| Fine particle | 1.0 | 1.0 | 1.0 | 1.0 | 1.0 |
| Properties | | | | | |
| Reflectance (%) 5° regular reflectance 555 nm | | | | | |
| Surface resistance (Ω) | | | | | |
| Strength (Increment in reflectance after rubbing with an eraser 50 times) | | | | | |

The above mixed solution was dropped on a glass face plate and further uniformly applied with a spinner.

The mixed solution-applied glass face plate was fired in air at 150° C. for about 30 minutes to decompose the tetraethoxysilane $[Si(CO_2H_5)_4]$. The ultrafine particles added to the alcohol solution were firmly fixed by a continuous uniform $SiO_2$ thin film formed by the decomposition, and an uneven surface was formed on the glass face plate. The structure of the anti-reflection film was the same as that shown in FIG. 12. Numerals 46E and 46F indicate an $SiO_2$ portion formed by the decomposition of tetraethoxysilane, and this portion contained an antistatic component as an additive.

The method of application of the solution shall not be limited to the above spinning method, and it may be a dipping method, a coating method, a spray method and a combination of these. The temperature for firing the solution-applied glass face plate is preferably in the range of 50° to 200° C.

The above glass face plate on which the anti-reflection film was formed was measured for a reflectance of light at an incident angle of 5° to show a reflectance of not more than 0.5% at a wavelength of 500 nm and a reflectance of not more than 1% in the wavelength region of 450 to 650 nm as shown in Table 1. These values fully satisfy the condition required for use in VDT (visual display terminal).

The anti-reflection film on the glass face plate was rubbed with an eraser (trade name, Lion 50-50, supplied by Lion Jimuki) under a load of 1 kg to show an increase in reflectance by only about 0.1 to 0.2% as shown in Table 1. Thus, the anti-reflection film had no problem. For comparison, a glass face plate on which an uneven surface was formed by conventional etching was tested in the same manner as above to show that the reflectance increased by 2% when it was rubbed only once. When it was rubbed five times, it showed the same reflectance as that of an untreated glass face plate.

Further, it is considered that a low surface resistance is obtained as shown in Table 1 for a reason that the antistatic components in the solution effectively work and do not have much influence on the anti-reflection performance and the film strength.

In the process for forming the above anti-reflection film, completed tube can be directly formed, and the anti-reflection film can be formed only by adding commercially available $SiO_2$ fine particles to an existing $Si(OR)_4$ alcohol solution and applying and firing it. The anti-reflection film can be formed safely at a low cost without using any harmful chemicals such as hydrofluoric acid, etc.

The ultrafine particles are not necessarily spherical, and they may be semi-spherical. When, however, the diameter of the ultrafine particles is too small, the outermost surface of a formed film is too smooth, and a sufficient anti-reflection effect may not be obtained. Therefore, the average particle diameter is preferably at least 50 nm (0.05 μm). Meanwhile, when the diameter is too large, the diffusion effect is too high, and the resolution decreases. Further, the film strength decreases. Therefore, the average diameter is preferably not more than 0.1 μm as defined as so-called ultrafine particles.

The method of application of the $Si(OR)_4$ alcohol solution containing the ultrafine particles may be any one of a dipping method, a coating method, a spray method and a combination of these in addition to the above spinning method. The firing temperature after the application is preferably in the range of approximately 50° to 200° C.

The above embodiment has used $Si(OR)_4$ in which R was ethyl. However, as described earlier, $Si(OR)_4$ wherein R is $C_nH_{2n+1}$ may be used in the range of n=1 to 5. With an increase in n, the viscosity of the solution increases a little. Therefore, an alcohol compatible with the increase can be selected as a solvent in view of operability.

Further, the above embodiment has used a salt of aluminum as a typical example of metal salts which are additives for imparting an antistatic effect. However, when a salt of any one of metal elements belonging to the groups II and III of the periodic table is used, a similar effect can be obtained. The above embodiment has used $SnO_2$ as a typical example of the electrically conductive metal oxide. However, the electrically conductive metal oxide may be selected from other known metal oxides such as $In_2O_3$ and $Sb_2O_3$ and composite metal oxides having a perovskite structure such as $LaNiO_3$ and $La_{1-x}Sr_xCoO_3$ (all of these have a specific resistivity of $10^{-1}$ Ω·cm at room temperature).

According to this embodiment, there is obtained an image display face plate on which an anti-reflection film having excellent anti-reflection effect, high mechanical strength and high antistatic performance is formed. Moreover, the face plate of the present invention can be produced by a safe and simple process without any treatment with a harmful chemical such as hydrofluoric acid, is suitable for mass-production and excellent in contamination resistance.

(Embodiment of formation of thin film)

0.2 Gram of the above oxide ultrafine particles having an anti-reflection performance were dispersed in 1 g of nitric acid, and 5 g of a silicic ester alcohol solution, 5 g of acetyl acetone and 0.1 g of dicarboxylic acid were added. The resultant mixture was stirred and dispersed. The resultant solution was dropped on a glass base plate and spin-coated at 600 rpm for 1 minute. The coated glass base plate was fired at 160° C. for 30 minutes. The formed film was measured for a regular reflectance of light at 5° in the visible light region of 400 to 700 nm to show 0.06%, and it had a surface resistance of 0.5 to $1 \times 10^7$ $\Omega/cm^2$.

$SiO_2$ ultrafine particles and $SnO_2+Sb_2O_3$ ultrafine particles were separately formed, and a mixture of these materials was prepared. A film was formed from the mixture in the same manner as above. The film had a surface resistance of several tens $G\Omega/cm^2$.

As described above, according to this embodiment, as least two kinds of oxide ultrafine particles are formed in the form of a nearly uniform mixture by the use of an-arc heat source. A film having-composite functions of electrical conductivity and anti-reflection performance can be formed from this mixture of the oxide ultrafine particles by applying it only once.

As the heat source for forming the above mixture of oxide ultrafine particles, induction plasma or arc plasma is used, and a mixture of oxide ultrafine particles can be similarly obtained by adding the above mixed powders to the plasma.

(Embodiment of undercoat clear electrically conductive film+anti-reflection film)

An electrically conductive undercoat film was formed on the front panel (glass face plate) of a Braun tube as shown in Embodiments 7 to 10 in Table 2.

In Embodiment 7, the electrically conductive film was formed of $SiO_2$, and the film formation was carried out by a CVD method under the following conditions.

Apparatus: Atmospheric pressure CVD system

Organic tin compound as material: $Sn(CH_3)_4$

Dopant: Freon gas Chlorofluorocarbon

Carrier gas: $N_2$

Base plate temperature (Glass face plate): 350° C.

In Embodiment 8, an $SiO_2$ thin film contained $SnO_2$ fine powders as clear electrically conductive fine powders, and the film was formed as follows.

| (1) Composition of alcohol solution of alkoxysilane, $Si(OR)_4$: | |
|---|---|
| Ethyl alcohol ($C_2H_5OH$) | 88 cc |
| Tetraethoxysilane ($Si(OC_2H_5)_4$) | 6 cc |
| $SnO_2$ clear electrically conductive fine powders | 1.2 g |
| Water ($H_2O$) | 6 cc |
| (2) Application of solution to glass face plate | spinner, 500 rpm |
| (3) Firing of coated film | 160° C., 30 minutes |

In addition, $In_2O_3$ and $Sb_2O_3$ were also used alone or in combination as clear electrically conductive fine powders in place of the above $SnO_2$, and films were formed in the same manner to give nearly the same results. Therefore, $SnO_2$ fine powders were described as a typical example.

In Embodiment 9, a composite target of $In_2O_3$ and $SnO_2$ (5 wt. %) was prepared, and a film was formed by depositing a mixture of $In_2O_3$ and $SnO_2$ on a glass face plate by a high-frequency sputtering method.

In Embodiment 10, an $SiO_2$ thin film contained aluminum nitrate, $Al(NO_3)_3 \cdot 9H_2O$ as a hygroscopic metal salt, and the film was formed as follows.

| (1) Composition of alcohol solution of alkoxysilane, $Si(OR)_4$: | |
|---|---|
| Ethyl alcohol ($C_2H_5OH$) | 88 cc |
| Tetraethoxysilane ($Si(OC_2H_5)_4$) | 6 cc |
| Metal salt, $Al(NO_3)_3 \cdot 9H_2O$ | 1.2 g |
| Water ($H_2O$) | 6 cc |
| (2) Application of solution to glass face plate | spinner, 500 rpm |
| (3) Firing of coated film | 160° C., 30 minutes |

In addition, $AlCl_3$, $Ca(NO_3)_2$, $Mg(NO_3)_2$, $ZnCl_2$, etc., were also used alone or in combination as a metal salt in place of the above aluminum nitrate, and films were formed in the same manner to give nearly the same results. Therefore, aluminum nitrate was described as a typical example.

Then, a thin film as an anti-reflection film was formed on each of the above-obtained electrically conductive undercoat films in the following manner.

Tetraethoxysilane $[Si(OC_2H_5)_4]$ was dissolved in ethanol, and water ($H_2O$) for hydrolysis and nitric acid ($HNO_3$) as a catalyst were added to prepare an alcohol solution. $SiO_2$ ultrafine particles prepared so as to have a particle diameter of 50 nm to 150 nm (ultrafine particles having a nearly spherical form) in an amount of 1% by weight were added to the above alcohol solution. At the same time, a suitable amount of acetyl acetone as a dispersant was added to fully disperse the ultrafine particles.

TABLE 2

| Item | Embodiment 7 | 8 | 9 | 10 | Comparison |
|---|---|---|---|---|---|
| Undercoat electrically conductive film wt. % | | | | | |
| Main component | $SnO_2$ | $SnO_2$ | $In_2O_3 + SnO_2$ | $SiO_2$ thin film containing hygroscopic component | Not formed |
| Formation method | CVD of organotin (Chemical deposition) | $SnO_2$ fine particles + Hydrolysis of alkoxysilane | Sputtering | Hydrolysis of alkoxysilane | |
| Film thickness nm | 10 | 30 | 10 | 100 | |
| Surface resistance ($\Omega/\square$) | $10^8$ | $10^8$ | $10^7$ | $10^{10}$ | |
| Mixed solution for antireflection film wt. % | | | | | |
| Alcohol solution of $Si(OC_2H_5)_4$ in ethanol | 50 | 50 | 50 | 50 | 50 |
| Dispersant (acetyl acetone) | 50 | 50 | 50 | 50 | 50 |
| $SiO_2$ fine particle | 1 | 1 | 1 | 1 | 1 |
| Properties | | | | | |
| Reflectance (%) (5° regular reflection) | | | | | |
| Strength % (increment in reflectance after rubbing with eraser 50 times) | | | | | |
| Attenuation time (sec) from switching off to 1 kV or less | | | | | |

The mixed solution shown in Table 2 was dropped on the electrically conductive undercoat film, and uniformly applied with a spinner.

Thereafter, the solution-applied undercoat film was fired in air at 150° C. for about 30 minutes to decompose tetraethoxysilane [$Si(OC_2H_5)_4$]. The $SiO_2$ fine particles added to the alcohol solution was firmly fixed with a continuous and uniform $SiO_2$ thin film formed by the decomposition.

Then, the resultant product was etched by immersing it in a 5 wt. % NaOH aqueous solution for about 15 seconds, washed with water and subjected to various tests.

The above-obtained anti-reflection film was measured for a reflectance (regular reflection light strength) of light having a wavelength of 550 nm at an incident angle of 5°. As shown in Table 2, the regular reflection light strength was not more than 0.4% when that of an Al-deposition film was taken as 100, and the reflectance was not more than 1% in the visible light region of 450 to 650 nm. In addition, a spectrophotometer, U-3400 supplied by Hitachi Limited, was used (in this embodiment and embodiments which will follow). This value fully satisfies the condition required of VDT (visual display terminal).

Then, the surface of the glass face plate on which the electrically conductive undercoat film and the anti-reflection film were laminated was rubbed with a rubber eraser (trade name, Lion 50-50, supplied by Lion Jimuki) forcibly (under a load of 1 kgf, the eraser having a cross section of 18×10 mm) and uniformly 50 times to show a shift in the reflectance by only about 0.1% to 0.2%. Thus, the product had no problem in quality.

In the test with the rubber eraser, the product was measured for a 60-degree mirror face gloss (see JIS K5100) before and after the rubbing 50 times.

(Embodiment of the particle size distribution)

The following is an embodiment in which the film was imparted with a particle size distribution. In this embodiment, patterns shown in FIG. 8 were also applied.

Figure 13:
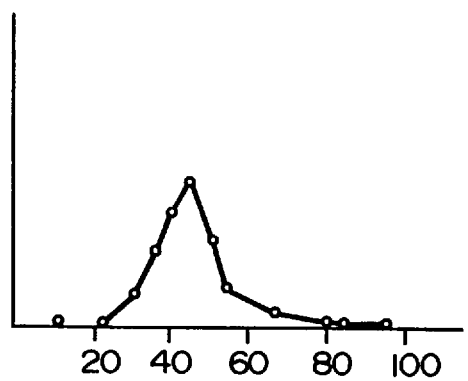
FIG. 13 shows a particle size distribution of one embodiment having a particle size distribution.

FIG. 13 shows the particle size distribution of $SiO_2$ ultrafine particles, and the average particle diameter was 450 nm. The $SiO_2$ ultrafine particles had a considerably broad particle size distribution and a specific surface area of 70 to 80 $m^2/g$. These ultrafine particles were dispersed in a solution of 1% by weight of $Si(OR)_4$ in a mixture of an alcohol and 50% acetyl acetone, and the resultant coating solution was applied to a glass base plate by a spin coat method. Then, the solution-applied glass base plate was fired at 160° C. for 30 minutes.

The above coating solution had a composition containing 1 to 2% by weight of $SiO_2$ and a remainder consisting of $Si(OC_2H_5)_4$ and 50% acetyl acetone, and coated with a spinner at 600 rpm for 30 seconds, and the resultant coating was dried and fired at 160° C. for 30 minutes.

Due to the use of ultrafine particles having the particle size distribution described in this Embodiment, the resultant film had proper pores. The film was subjected to the above etching treatment and then measured for a reflection characteristic to show 0.06 to 0.3% in the visible light region (400 to 700 nm). Further, an $Si(OR)_4$ alcohol solution and a 50% acetyl acetone solution were applied on this film, and the resultant coating was fired to give a film having a transmittance of at least 90%. This Embodiment has an effect of giving an excellent anti-reflection film by a simple method.

In addition, it is preferred to wash the glass base plate surface and preliminarily heat the glass base plate up to about 50° C. before the formation of the anti-reflection film.

What is claimed is:

1. An image display having an image display plate comprising a transparent base plate, a film containing ultrafine particles provided thereon, and a binder, said ultrafine particles comprising substantially spherical ultrafine particles, each of which having been treated to have an uneven surface so as to provide the image display plate with an anti-reflection function and high resolution, wherein said substantially spherical ultrafine particles having an uneven surface have an average diameter of not more than 100 nm and have pores formed substantially uniformly on their surface, said pores forming said uneven surface.

2. An image display according to claim 1, wherein said substantially spherical ultrafine particles have a porosity of about 50%.

3. An image display according to claim 1, wherein a diameter of each of said pores is not more than 50 nm.

4. An image display having an image display plate comprising a transparent base plate, a film containing ultrafine particles provided thereon, and a binder, said ultrafine particles comprising substantially spherical ultrafine particles, each of which having been treated to have an uneven surface so as to provide the image display plate with an anti-reflection function and high resolution, wherein each of said substantially spherical ultrafine particles having an uneven surface comprises an aggregate of particles made of the same material, each aggregate having an average particle diameter of not more than 0.2 $\mu$m, gaps between the particles forming said uneven surface.

5. An image display according to claim 4, wherein said aggregate comprise a plurality of particles having a diameter of not more than 50 nm.

6. An image display according to claim 4, wherein said aggregate comprise a plurality of particles having a diameter of not more than 50 nm.

7. An image display comprising an image display plate comprising a transparent base plate, a film containing ultrafine particles provided thereon, and a binder, said ultrafine particles comprising substantially spherical ultrafine particles, each of said substantially spherical ultrafine particles having been treated to have an uneven surface so as to provide the image display plate with an anti-reflection function and high resolution, wherein each of said substantially spherical ultrafine particles comprises an aggregate of particles, wherein each aggregate comprises a first particle having an average particle diameter of 100 to 150 nm and a plurality of second, smaller particles adsorbed on a surface thereof, wherein said second, smaller particles are electrically conductive.

8. An image display according to claim 7, wherein said second smaller particles are made of a material selected from the group consisting of $SnO_2$, $Sb_2O_3$ and $In_2O_3$.

9. An image display according to claim 8, wherein said second, smaller particles have an average particle diameter not more than $\frac{1}{10}$ of the average particle diameter of said first particle.

10. An image display according to claim 9, wherein said first particle is made of at least one material selected from the group consisting of $SiO_2$ and $MgF_2$.

* * * * *